(12) United States Patent
Isenhour et al.

(10) Patent No.: US 8,520,989 B2
(45) Date of Patent: Aug. 27, 2013

(54) FIBER OPTIC INTERFACE DEVICES FOR ELECTRONIC DEVICES

(75) Inventors: Micah Colen Isenhour, Lincolnton, NC (US); Dennis Michael Knecht, Hickory, NC (US); James Phillip Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 218 days.

(21) Appl. No.: 13/050,733

(22) Filed: Mar. 17, 2011

(65) Prior Publication Data

US 2011/0229078 A1    Sep. 22, 2011

Related U.S. Application Data

(60) Provisional application No. 61/315,425, filed on Mar. 19, 2010.

(51) Int. Cl.
*G02B 6/32*    (2006.01)

(52) U.S. Cl.
USPC .......................................................... 385/33

(58) Field of Classification Search
None
See application file for complete search history.

(56) References Cited

U.S. PATENT DOCUMENTS

| | | | |
|---|---|---|---|
| 4,213,677 A | 7/1980 | Sugimoto et al. | 350/96.18 |
| 4,268,112 A | 5/1981 | Peterson | 350/96.18 |
| 4,613,199 A * | 9/1986 | McGeary | 439/585 |
| 4,701,011 A | 10/1987 | Emkey et al. | 350/96.18 |
| 5,134,679 A * | 7/1992 | Robin et al. | 385/90 |
| 5,172,271 A | 12/1992 | Sinclair | 359/652 |
| 5,384,874 A | 1/1995 | Hirai et al. | 385/34 |
| 5,625,733 A * | 4/1997 | Frigo et al. | 385/88 |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,923,802 A | 7/1999 | Giebel et al. | 385/76 |
| 6,012,852 A | 1/2000 | Kadar-Kallen et al. | 385/74 |
| 6,033,125 A | 3/2000 | Stillie et al. | 385/75 |
| 6,157,485 A | 12/2000 | Cheng | 359/495 |
| 6,246,026 B1 | 6/2001 | Vergeest | 219/121.72 |
| 6,371,787 B1 * | 4/2002 | Branch et al. | 439/352 |
| 6,542,665 B2 | 4/2003 | Reed et al. | 385/34 |

(Continued)

FOREIGN PATENT DOCUMENTS

| | | |
|---|---|---|
| AU | 199898138 B2 | 8/1999 |
| JP | 63-293510 | 11/1988 |
| WO | WO01/11409 A2 | 2/2001 |
| WO | WO03/076993 A1 | 9/2003 |

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

(Continued)

*Primary Examiner* — Sung Pak

(57) ABSTRACT

Small-form fiber optic interface devices (20) for electronic devices (200) are disclosed. The device has a ferrule (50) with a body (51) that operably supports at least one waveguide (152) and at least one electrical wire (160). The device has a first electrical contact (90) supported by the ferrule body and a second electrical contact (100) that substantially surrounds the outer surface (57) of the ferrule body front section (56). The ferrule body comprises a dielectric material at least partially interposed between the first and second electrical contacts.

32 Claims, 17 Drawing Sheets

(56) References Cited

U.S. PATENT DOCUMENTS

| | | | |
|---|---|---|---|
| 6,543,941 B1* | 4/2003 | Lampert | 385/58 |
| 6,588,938 B1* | 7/2003 | Lampert et al. | 385/58 |
| 6,632,025 B2 | 10/2003 | Ukrainczyk | 385/70 |
| 6,655,850 B2 | 12/2003 | Mann et al. | 385/74 |
| 6,687,434 B2 | 2/2004 | Ishikawa | 385/34 |
| 6,736,547 B2 | 5/2004 | Stevens et al. | 385/61 |
| 6,832,859 B1* | 12/2004 | Bell et al. | 385/78 |
| 6,837,625 B2 | 1/2005 | Schott et al. | 385/60 |
| 6,899,464 B2 | 5/2005 | Stevens et al. | 385/53 |
| 6,963,687 B2 | 11/2005 | Vergeest et al. | 385/123 |
| 7,077,576 B2 | 7/2006 | Luther et al. | 385/59 |
| 7,104,701 B1 | 9/2006 | Durrant et al. | 385/74 |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,357,005 B2 | 4/2008 | Matsumura et al. | 65/387 |
| 7,460,750 B2 | 12/2008 | Durrant et al. | 385/35 |
| 7,572,071 B1 | 8/2009 | Wu | 385/94 |
| 7,603,008 B2 | 10/2009 | Matsumura et al. | 385/35 |
| 7,775,725 B2 | 8/2010 | Grinderslev | 385/74 |
| 2002/0146211 A1 | 10/2002 | Stevens et al. | 385/61 |
| 2003/0012513 A1 | 1/2003 | Ukrainczyk | 385/61 |
| 2003/0021543 A1 | 1/2003 | Mann et al. | 385/74 |
| 2003/0123813 A1* | 7/2003 | Ravasio et al. | 385/88 |
| 2004/0009697 A1 | 1/2004 | Clark et al. | 439/362 |
| 2004/0228589 A1* | 11/2004 | Melton et al. | 385/100 |
| 2006/0039655 A1* | 2/2006 | Wilson | 385/79 |
| 2006/0098921 A1* | 5/2006 | Benaron et al. | 385/75 |
| 2006/0147157 A1* | 7/2006 | Manning et al. | 385/78 |
| 2006/0222299 A1 | 10/2006 | Durrant et al. | 385/74 |
| 2007/0160327 A1* | 7/2007 | Lewallen et al. | 385/53 |
| 2008/0050072 A1 | 2/2008 | Durrant et al. | 385/74 |
| 2008/0124029 A1* | 5/2008 | Mitamura | 385/60 |
| 2008/0279509 A1 | 11/2008 | Durrant et al. | 385/72 |
| 2009/0041412 A1 | 2/2009 | Danley et al. | 385/85 |
| 2009/0324175 A1 | 12/2009 | Everett et al. | 385/72 |
| 2009/0324176 A1 | 12/2009 | Cheng et al. | 385/73 |
| 2010/0027943 A1 | 2/2010 | Armani et al. | 385/74 |
| 2010/0104244 A1 | 4/2010 | Grinderslev | 385/74 |
| 2010/0215325 A1 | 8/2010 | Tamura et al. | 385/89 |
| 2012/0099822 A1 | 4/2012 | Kuffel et al. | 385/78 |

OTHER PUBLICATIONS

Emkey, et al., "Analysis and Evaluation of Graded-Index Fiber-Lenses," Journal of Lightwave Technology, vol. LT-5, No. 9, Sep. 1987, pp. 1156-1164.

Palais, Joseph C, "Fiber coupling using graded-index rod lenses," Applied Optics, Jun. 15, 1980, vol. 19, No. 12, pp. 2011-2018.

Chanclou, et al., "Design and demonstration of a multicore single-mode fiber coupled lens device," Optics Communications 233, 2004, pp. 333-339.

Senior, et al., "Misalignment losses at multimode graded-index fiber splices and GRIN rod lens couplers," Applied Optics, Apr. 1, 1985, vol. 24, No. 7, pp. 977-983.

Gilsdorf, et al., "Single-mode fiber coupling efficiency with graded-index rod lenses," Applied Optics, Jun. 1, 1994, vol. 33, No. 16, pp. 3440-3445.

Cusworth, et al., "Angular tilt misalignment loss at a GRIN rod lens coupler," Applied Optics, Jun. 1, 1986, vol. 25, No. 11, pp. 1775-1779.

Patent Cooperation Treaty, International Search Report and Written Opinion, May 24, 2011, 8 pgs.

Patent Cooperation Treaty, International Search Report and Written Opinion, Jul. 20, 2011, 12 pages.

\* cited by examiner

US 8,520,989 B2

FIBER OPTIC INTERFACE DEVICES FOR ELECTRONIC DEVICES

CLAIM OF PRIORITY

This application claims the benefit of priority under 35 U.S.C. §119(e) of U.S. Provisional Application Ser. No. 61/315,425 filed on Mar. 19, 2010.

FIELD

The present disclosure relates generally to fiber optic interface devices, and in particular relates to fiber optic interface devices having a small form factor and suitable for use with electronic devices, particularly consumer electronic devices.

BACKGROUND

Optical fiber is increasingly being used for a variety of applications, including but not limited to broadband voice, video, and data transmission. As consumer devices are steadily using more bandwidth, fiber optic interface devices for these devices will likely move away from electrical connections and toward using optical connections for increased bandwidth. Generally speaking, conventional fiber optic interface devices used for telecommunication networks and the like are not suitable for consumer electronic devices.

For instance, conventional fiber optic interface devices are relatively large compared with the consumer devices and their interfaces. Additionally, conventional fiber optic interface devices are deployed with great care into relatively clean environments and/or cleaned by the craft before connecting the same. Further, even though fiber optic interface devices are reconfigurable (i.e., suitable for mating/unmating), they are not intended for a relatively large number of mating cycles. Instead, conventional fiber optic interface devices are high-precision connectors designed for reducing insertion loss between mating fiber optic interface devices in the optical network.

On the other hand, the consumer electronic devices are expected to have a relatively large number of mating/unmating cycles during ordinary operation. The consumer electronic devices will be operated in a multitude of environments where dirt, dust, and other debris are encountered on a regular basis. Further, consumer electronic devices typically have size and space constraints for making connections. Consequently, there is an unresolved need for fiber optic interface devices suitable for consumer electronic devices.

SUMMARY

An aspect of the disclosure is a fiber optic interface device that includes housing having a front end, a rear end and an interior. The device also includes a ferrule having a body with a front section having an outer surface and a front end with a front surface, and a rear section with a rear end. The ferrule rear section is supported in the housing interior with the ferrule front section extending from the housing front end. The ferrule body has at least one bore formed therein that supports at least one optical waveguide that terminates within the ferrule. The ferrule has at least one lens defined on the ferrule front surface and that is operably aligned with the at least one bore. The device also includes a first electrical contact supported by the ferrule body. The device further includes a second electrical contact. The second electrical contact substantially surrounds the ferrule body outer surface of the ferrule front section. The ferrule body comprises a dielectric material at least partially interposed between the first and second electrical contacts.

Another aspect of the disclosure is a fiber optic interface device for an electronic device having an optical transmitter and an optical receiver. The device includes a housing having front and rear open ends and an interior. The device also includes a light-transmitting system. The light transmitting system has a front surface and resides at least in part within the housing interior. The light-transmitting system has at least one transmit lens and at least one receive lens. The light-transmitting system defines respective transmit and receive optical paths from the optical transmitter and optical receiver to the front surface of the light-transmitting system. The light-transmitting system defines at least one change in direction in each of the transmit and receive optical paths.

Another aspect of the disclosure is a fiber optic interface device that has a housing with a front end, a rear end and an interior. The device includes a ferrule having a body with opposite sides, a front section having a front end with a front surface, and a rear section with a rear end. The ferrule rear section is supported in the housing interior with the ferrule front section extending from the housing front end. The ferrule body has at least one bore formed therein configured to support at least one optical waveguide that terminates at the ferrule body front surface. The ferrule body having at least one angled facet adjacent the front end and aligned with the at least one bore. The angled facet is configured to have utility in laser processing the at least one optical waveguide. The device includes first and second electrical contacts disposed on the ferrule body sides. The ferrule body front end has a transverse dimension of between about 2 mm and about 4 mm.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various exemplary embodiments of the disclosure, and together with the description serve to explain the principles and operations of the disclosure.

DETAILED DESCRIPTION

Figure 1:
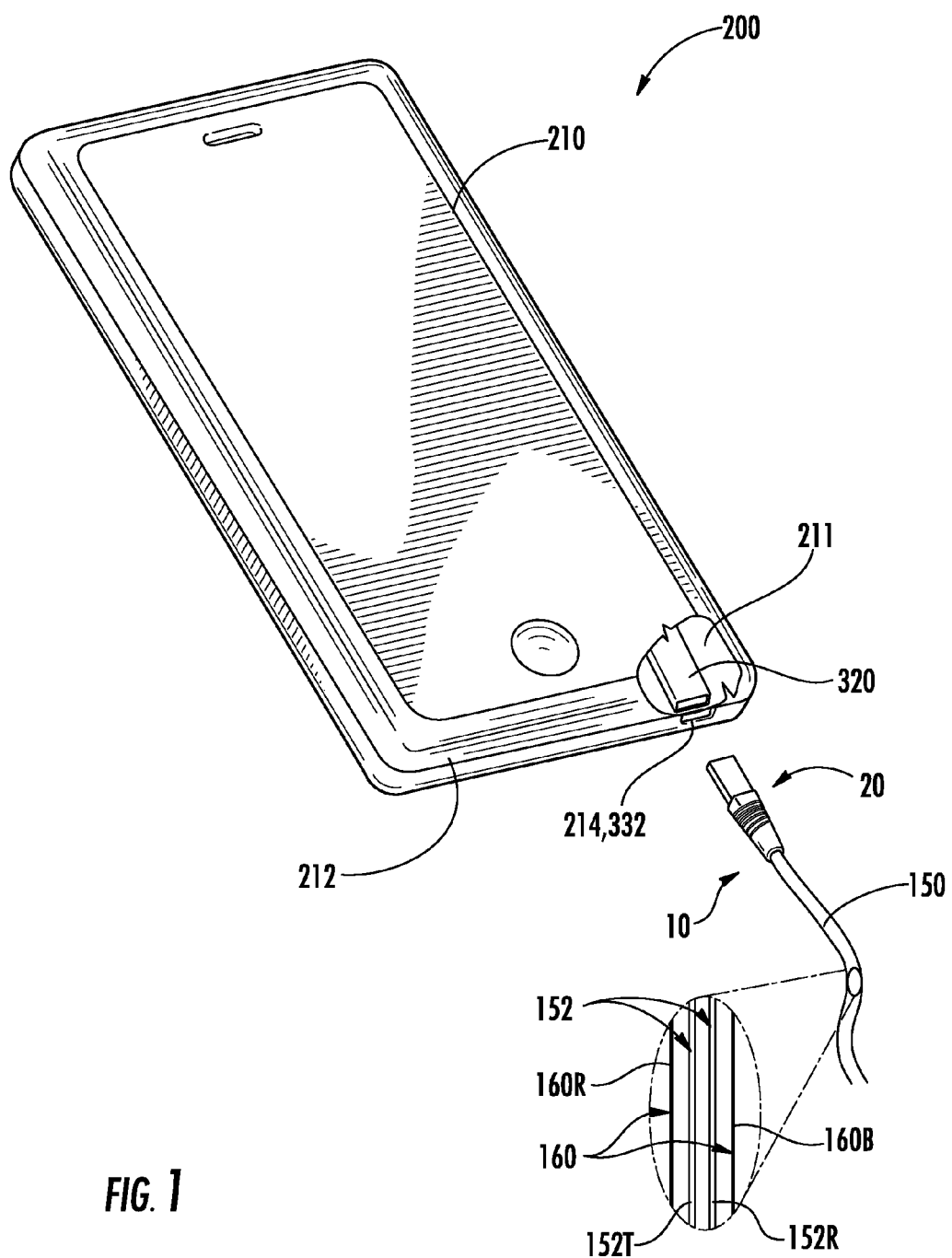
FIG. 1 is an elevated view of an example fiber optic cable assembly next to an electronic device.

Reference is now made in detail to the present preferred embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

In some of the Figures, Cartesian coordinates are shown for reference. Also, the terms "plug" and "receptacle" are used as shorthand for different types of fiber optic interface devices for the sake of distinguishing different parts of an interface device assembly. Further, in some of the examples discussed below, the receptacle is part of an electronic device, and a plug is used to plug into the receptacle of the electronic device.

In the discussion below, the term "electronic device" means a device that has either electronic or optical and electronic components and functionality, including a receptacle and associated hardware configured to receive, transmit or both transmit and receive optical signals and also configured to communicate electrical power.

The fiber optic interface devices, fiber optic interface assemblies, and cable assemblies described herein are suitable for making optical or both optical and electrical connections for a variety of devices, and are particularly well suited for consumer electronic devices. The concepts of the disclosure advantageously allow the simple, quick, and economical connection and disconnection of the fiber optic interface devices for a relatively large number of mating cycles.

FIG. 1 is an elevated view of an example fiber optic cable assembly 10 next to an electronic device 200. Electronic device 200 includes a housing 210 that defines a housing interior 211 that contains a fiber optic interface device 320. Housing 210 includes a side 212 and fiber optic interface device 320 is adjacent side 212. Electronic device housing side 212 includes an aperture 214 that leads to a front aperture 332 of fiber optic interface device 320. Fiber optic interface device 320 is configured to receive a plug-type fiber optic interface device 20. Accordingly, fiber optic interface device 320 is referred to hereinbelow as receptacle 320.

Figure 5:
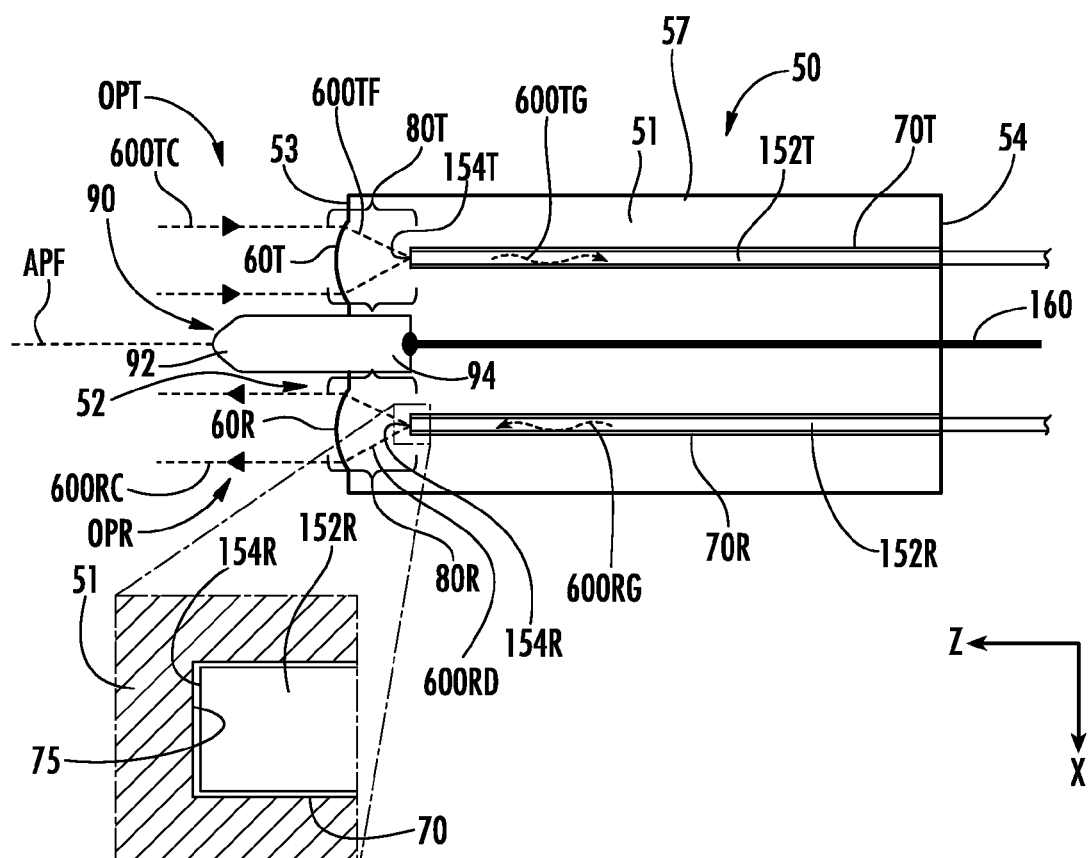

Fiber optic cable assembly 10 includes a fiber optic interface device 20 operably connected to a fiber optic cable 150. In an example, fiber optic cable 10 carries at least one optical fiber 152, e.g., two optical fibers 152T and 152R, with one being a transmit optical fiber and the other a receive optical fiber for respectively carrying transmit and receive optical signals. The at least one optical fibers 152 has an end 154, e.g., optical fibers 152T and 152R have respective ends 154T and 154R, as best seen in FIG. 5 introduced and discussed below.

Also in an example embodiment, fiber optical cable 150 carries at least one electrical wire 160, e.g., two electrical wires 160B and 160R ("black and red") that can carry electrical power. In the example where fiber optic cable 150 carries at least one optical fiber 152 and at least one electrical wire 160, fiber optic interface device 20 provides both optical and electrical communication and functionality.

Figure 2A:
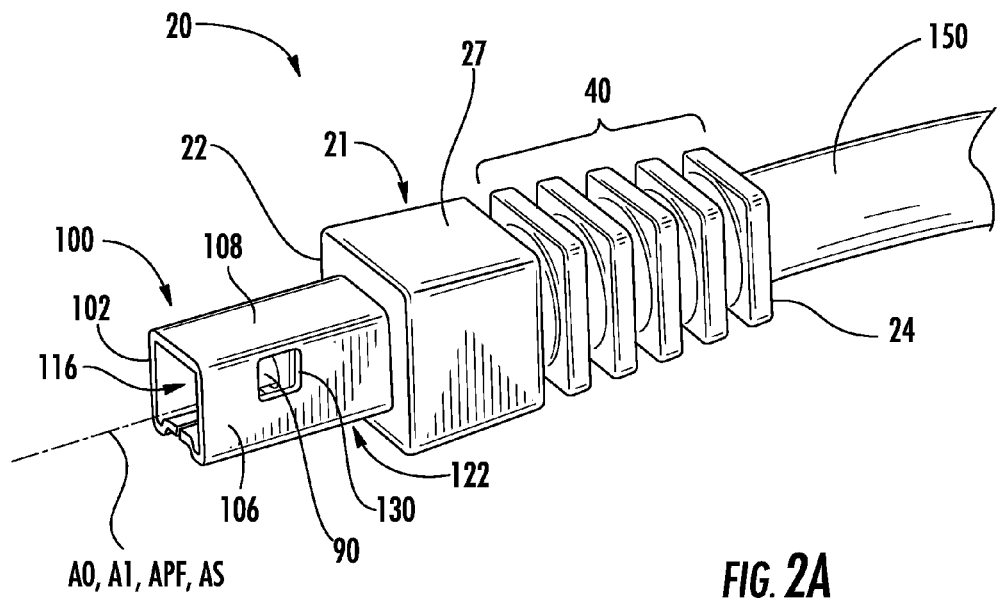
FIG. 2A and FIG. 2B are respective front elevated views of the top and bottom of the fiber optic interface device (plug) of the fiber optic cable assembly of FIG. 1.
Figure 2B:
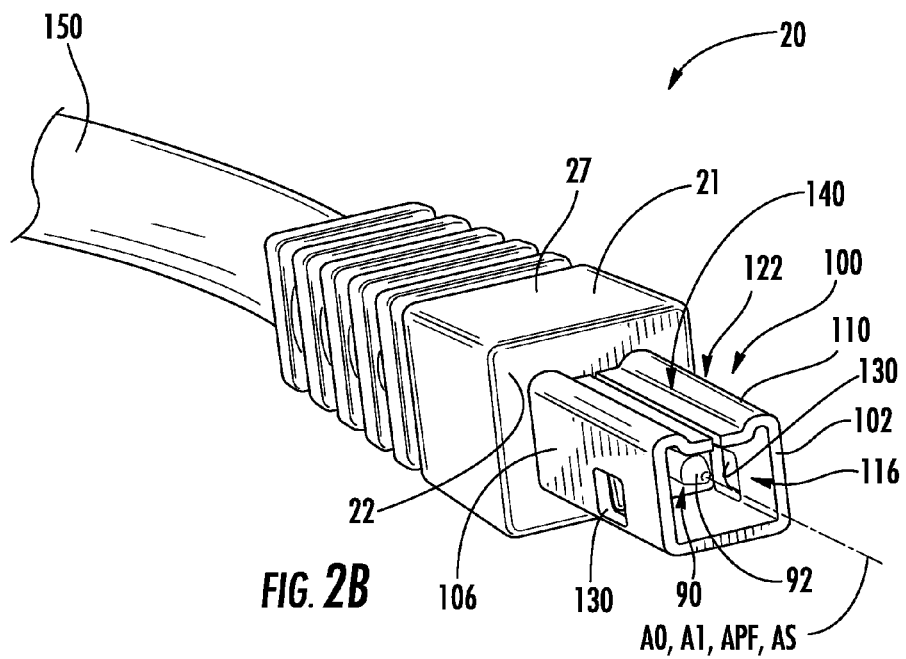
Figure 2C:
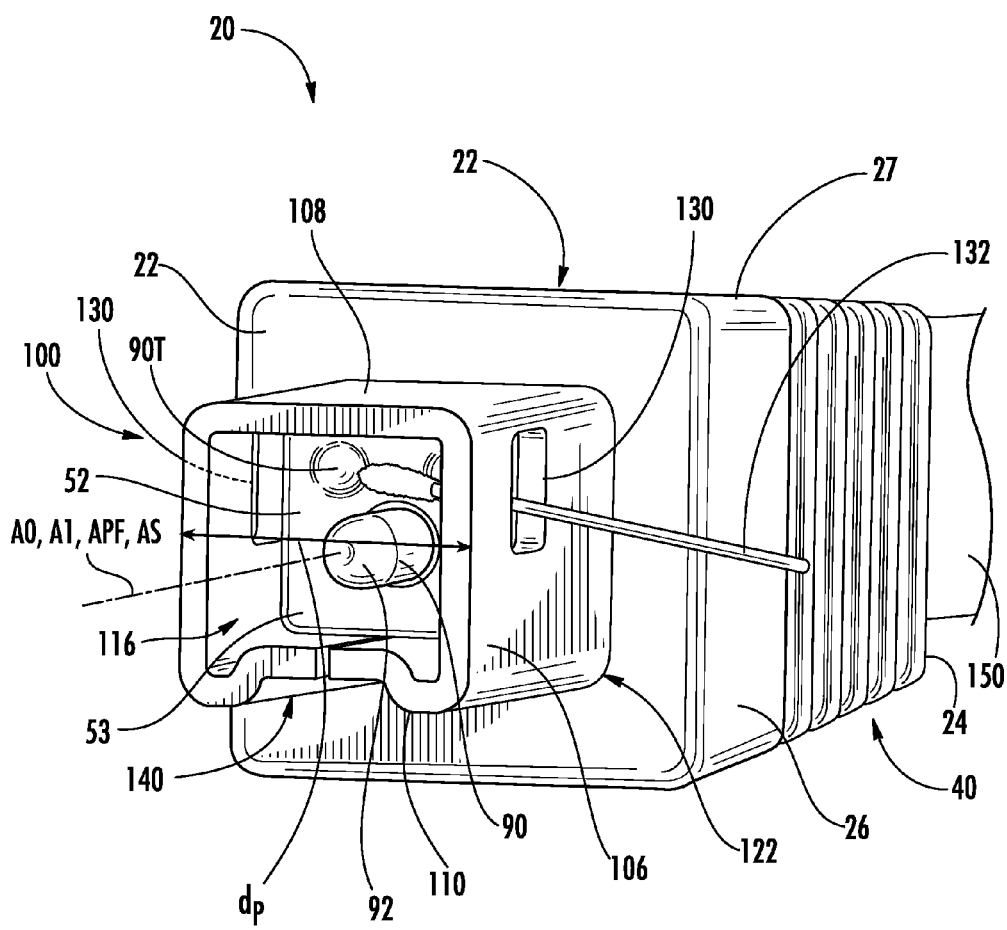
FIG. 2C is a front-on elevated view of the plug of FIG. 2A and FIG. 2B.

FIG. 2A is a front elevated view of the top of fiber optic interface device 20, while FIG. 2B is front-elevated view of the bottom of the fiber optic interface device. To distinguish between other fiber optic interface devices introduced and discussed below, and for ease of discussion, fiber optic interface device 20 is referred to hereinbelow as plug 20. FIG. 2C is a front-on elevated view of plug 20.

Figure 3A:
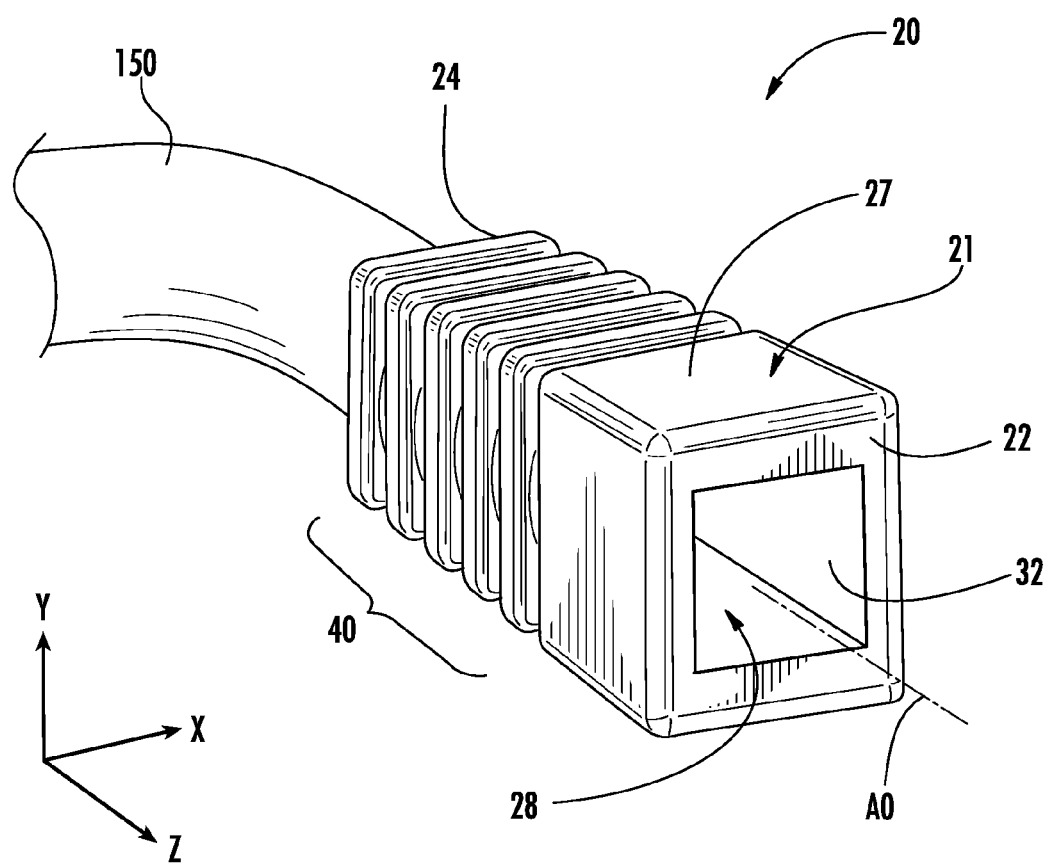
FIG. 3A is a front elevated view of an example plug housing.
Figure 3B:
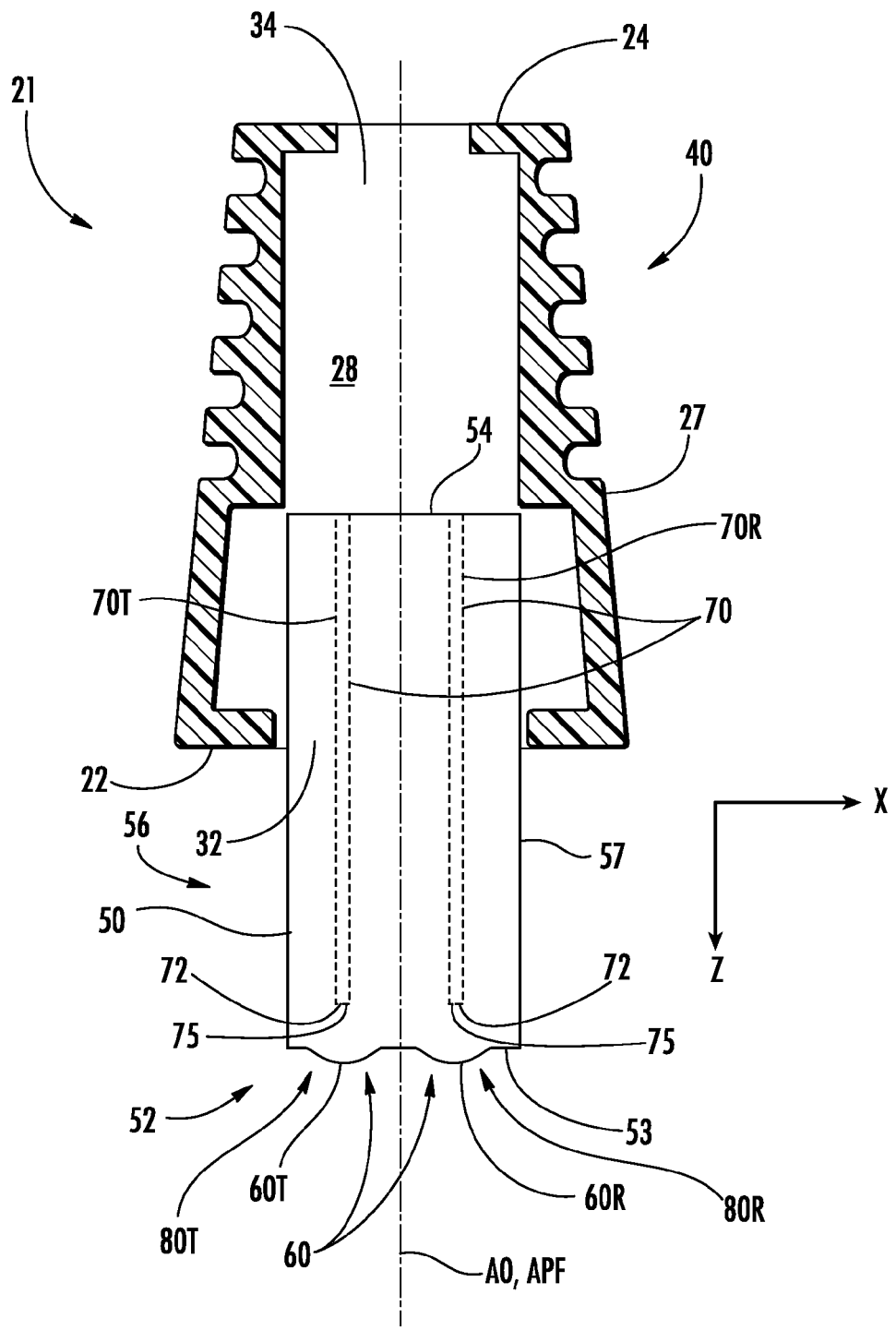
FIG. 3B is a cross-sectional view of an example plug housing and plug ferrule as taken in the X-Z plane.

With reference to FIG. 2A through FIG. 2C, plug 20 includes a housing 21 with a central axis A0, a front end 22, a rear end 24 and sides 26 that constitute part of housing exterior surface 27. FIG. 3A is a front elevated view of an example plug housing 21, while FIG. 3B is a cross-sectional view of an example plug housing and plug ferrule 50 taken in the X-Z plane. Housing 21 defines a housing interior 28, a front aperture 32 and a rear aperture 34. A portion of housing exterior surface 27 adjacent housing rear end 24 includes strain-relief features 40 that serve to reduce the amount of strain on fiber optic cable 10 where the fiber optic cable connects to the housing. Plug 20 includes a central axis A1 that is co-axial with housing central axis A0. In an example, housing 21 is formed by overmolding and has a unitary structure.

Figure 4:
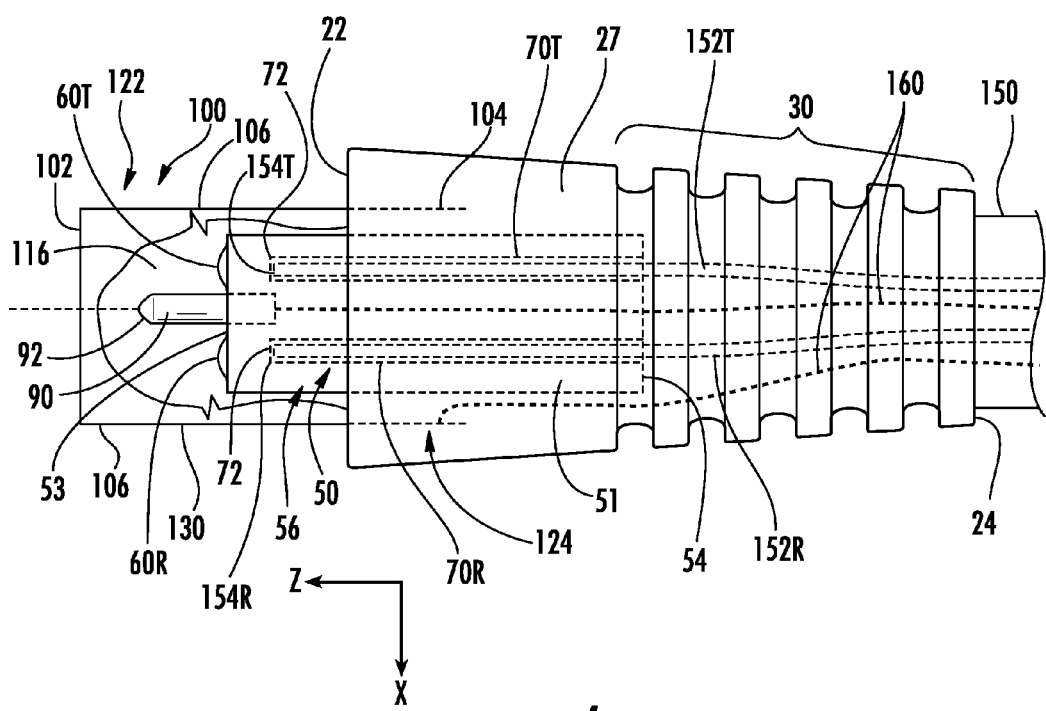
FIG. 4 and FIG. 5 illustrate an example where the plug ferrule includes transmit and receive bores that respectively support transmit and receive optical fibers.

Plug 20 also includes a plug ferrule 50 (see FIG. 3B) arranged in housing interior 28 and that extends from front aperture 32 at housing front end 22. FIG. 4 is a top-down view of plug 20, and FIG. 5 is a close-up view of plug ferrule 50. Plug ferrule 50 has a body 51 that includes front end 52 with a front surface 53 that includes at least one convex curved surface portion 60, and also includes rear end 54. In the example shown, two convex curved portions 60T and 60R are shown. Plug ferrule 50 includes a central axis APF that in an example is generally aligned with housing axis A0 and plug axis A1. In an example, axes A0, A1 and APF are coaxial. Plug ferrule 50 also has a front section 56 with outer surface 57 that does not include front-end surface 53. Plug ferrule front section 56 is defined by the portion of plug ferrule 50 that extends from housing front end 22.

In an example, plug ferrule 50 is made of a material that is substantially transparent to wavelengths in the range from 850 nm to 1550 nm. Example materials for plug ferrule 50 include a transparent resin such as Polyetheremide ((PEI), sold by the General Electric Company under the trademarked name ULTEM® 1010).

Plug ferrule 50 includes at least one bore 70 that runs from plug ferrule rear end 54 and parallel to plug ferrule central axis APF. The at least one bore 70 terminates at an end 72 near plug ferrule front end 52, with the at least one bore being aligned with the at least one convex curved portion 60 of plug ferrule front surface 53. Two bores 70T and 70R (i.e., transmit and receive bores) are shown by way of example. Bore end 72 and plug ferrule body 51 define an associated surface 75 at bore end 72. The bore end surface 75, the corresponding curved surface portion 60 on plug ferrule front surface 53, and the intervening curved portion 60 of plug ferrule body 51 constitutes a plug lens 80 having a focal length. Thus, curved surface portion 60 is referred to hereinafter as lens front surface 60. In an example, bore end 72 is axially spaced apart from lens front surface 60 by about one focal length. Two plug lenses 80T and 80R (i.e., transmit and receive plug lenses) aligned with respective bores 70T and 70R are shown by way of example in FIG. 3B.

FIG. 4 and FIG. 5 illustrate an example where plug ferrule 50 includes the aforementioned two bores 70T and 70R (i.e., transmit and receive bores) that respectively support transmit and corresponding receive optical fibers 152T and 152R. The transmit and receive optical fibers 152T and 152R are respectively aligned with transmit and receive plug lenses 80T and 80R. Also shown in FIG. 5 are portions of the transmit optical path OPT and receive optical path OPR respectively associated with transmit light 600T and receive light 600R.

Plug ferrule 50 also supports a plug electrical contact 90 (not shown in FIG. 3B) as best viewed in FIG. 2B and FIG. 2C. An example electrical contact 90 is in the form of a pin and has a front portion 92 that extends outward from plug ferrule end 52 along plug ferrule central axis APF. Electrical contact 90 also includes a rear portion 94 that resides within plug ferrule body 51 and that is electrically contacted with at least one electrical wire 160. In an example, electrical contact 90 is used to conduct electrical power and is for example, frictionally engaged with or bonded to the ferrule. In the example electrical contact 90 takes the form of a pin, but other electrical contact forms can be used for example, a blade, a cylinder, a spring contact, a wire, a male or female shaped contact, or a conductive electrical trace on the ferrule.

With reference to FIG. 4 and also to FIG. 2C, plug 20 also includes a sheath 100 that includes front and rear ends 102 and 104, opposite sides 106, opposite top and bottom surfaces 108 and 110 and an interior 116. Sheath 100 can completely or at least partially cover ferrule front section 56 and has, for example, a generally cylindrical shape (e.g., with a rectangular or square cross-sectional shape) and includes a front section 122 adjacent sheath front end 102 and a rear section 124 adjacent rear end 104. Thus, sheath 100 substantially surrounds ferrule front section 56. Plug housing 21 supports sheath rear section 124 so that sheath front section 122 extends axially outward from housing front end 22 and in an example extends beyond plug ferrule front end 52. Sheath 100 includes a central axis AS that is aligned with housing central axis A0, plug central axis A1 and ferrule central axis APF, and in an example, these axes are aligned, for example, in a co-axial alignment. In an example, sheath 100 is made of a conductive material and serves as an additional electrical contact to central electrical contact 90. In this case, a second electrical wire 160 is electrically contacted to sheath 100 at its rear section 124 or rear end 104 (FIG. 4). The ferrule 50 material has suitable dielectric properties to prevent shorting between the sheath 100 and electrical contact 90 and is at least partially interposed therebetween for that purpose.

With reference again to FIG. 2A through FIG. 2C, sheath 100 includes at least one aperture 130 in at least one sheath side 106 sized to provide access for a cleaning element 132 to clean lens front surfaces 60T and 60R of transmit and receive lenses 80T and 80R.

Also in an example, at least one of the sheath's top and bottom surfaces 108 and 110 includes a keying feature 140, such as a groove as best seen in FIG. 2B and FIG. 2C. With reference to FIG. 2C, in an example sheath 100 has a transverse dimension $d_P$ in the range from about 2 mm to about 4 mm. The "horizontal" transverse dimension $d_P$ is shown by way of example, and this transverse dimension $d_P$ can also be in the "vertical" transverse direction.

With reference again to FIG. 5 and receive optical OPR, guided receive light 600RG traveling in fiber optic cable 150 in receive optical fiber 152R in the direction of plug ferrule front end 52, exits the receive optical fiber end 154R to form divergent receive light 600RD. Divergent receive light 600RD travels to receive lens 80R, which forms either substantially collimated receive light 600RC, which may be weakly divergent. In addition, with respect to transmit optical path OPT, substantially collimated transmit light 600TC from receptacle 320 (as discussed below) is incident upon transmit lens 80T, which forms focused transmit light 600TF that focuses onto transmit optical fiber end 154T. This focused light is coupled into transmit optical fiber 152T and travels therein as guided transmit light 600TG, which then travels down fiber optic cable 150.

Figure 6A:
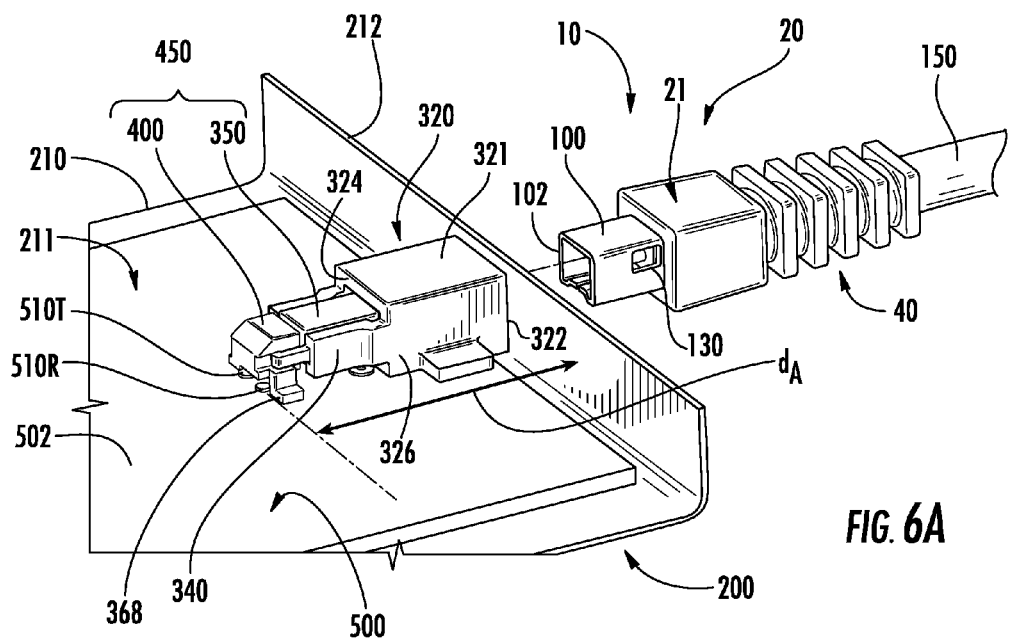
FIG. 6A and FIG. 6B are respective rear and front elevated, close-up cut-away views of an example fiber optic cable assembly next to the electronic device, with the top portion of electronic device housing removed to show the receptacle contained therein.
Figure 6B:
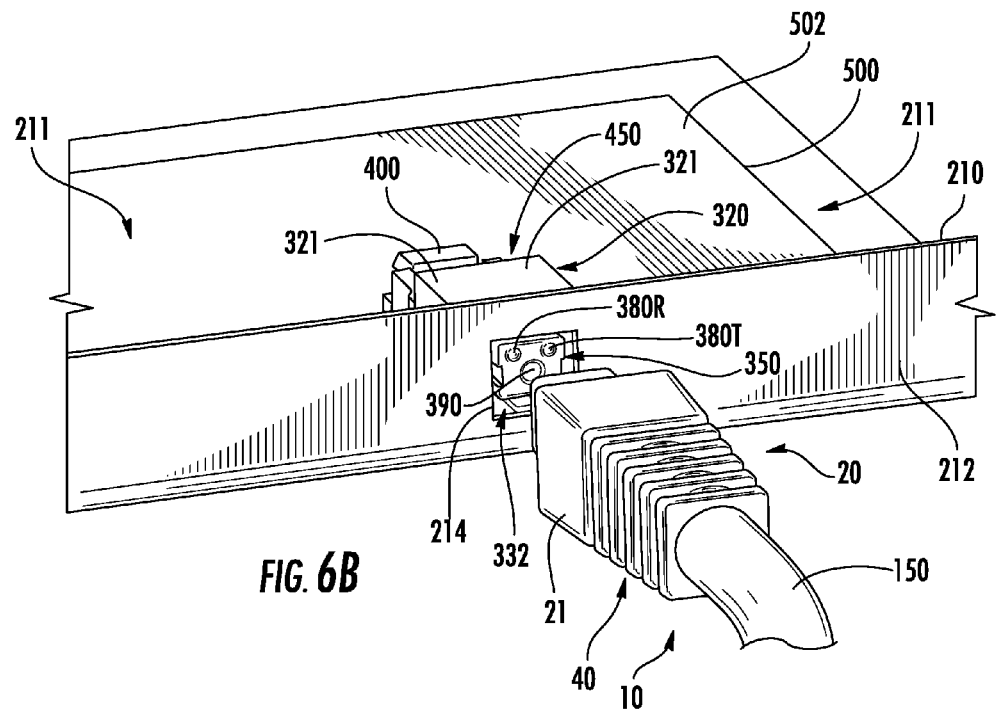
Figure 6C:
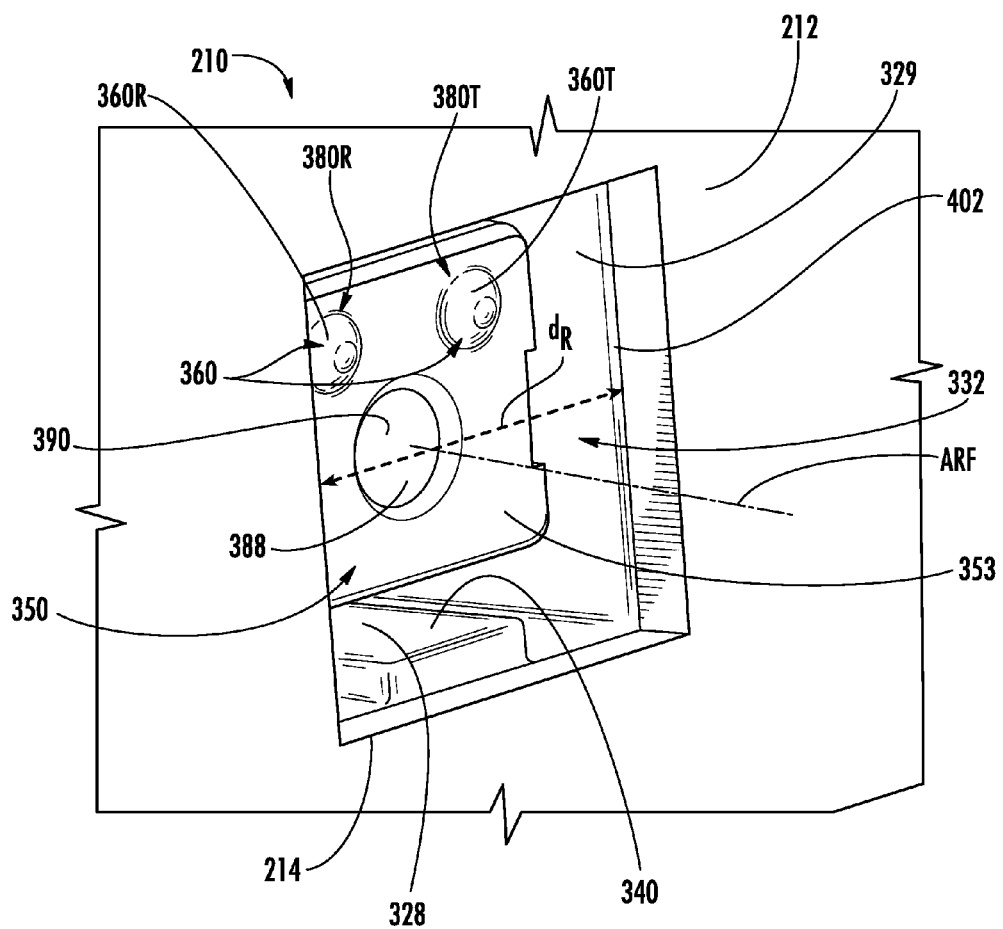
FIG. 6C is a close-up view of the side of the electronic device housing and shows the housing side aperture and the front end of the light-transmission member of the receptacle.

FIG. 6A and FIG. 6B are respective rear- and front-elevated, close-up cut-away views of an example fiber optic cable assembly 10 next to electronic device 200. The top portion of electronic device housing 210 is removed to show receptacle 320. FIG. 6C is a close-up view of side 212 of electronic device housing 210. Housing side 212 includes an aperture 214 that leads to receptacle front-end aperture 332.

Receptacle 320 is shown supported on a surface 502 of a circuit board 500. Circuit board 500 operatively supports a light emitter ("optical transmitter") 510T and a photodetector ("optical receiver") 510R. In an example, optical transmitter 510T is or includes a laser such as a vertical-cavity surface-emitting laser (VCSEL), and optical receiver 510R is or includes a photodiode.

Receptacle 320 includes a housing 321 having a front end 322, a rear end 324 and opposite sides 326. Front end 322 is open and defines aforementioned front-end aperture 332. Rear end 324 is also open and defines a rear-end receptacle aperture 334. Thus, receptacle housing 321 defines an interior 328 with interior walls 329, with interior 328 being is open at front and rear ends 322 and 324, and generally configured as a sleeve. Receptacle 320 includes two side arms 340 that extend rearward from and parallel to sides 326 at receptacle housing rear end 324.

With reference to FIG. 6C, in an example receptacle housing front-end aperture 332 has a transverse dimension $d_R$ in the range from 2 mm to 4 mm. The "horizontal" transverse dimension $d_R$ is shown by way of example, and this transverse dimension $d_R$ can also be in the "vertical" transverse direction.

Figure 7A:
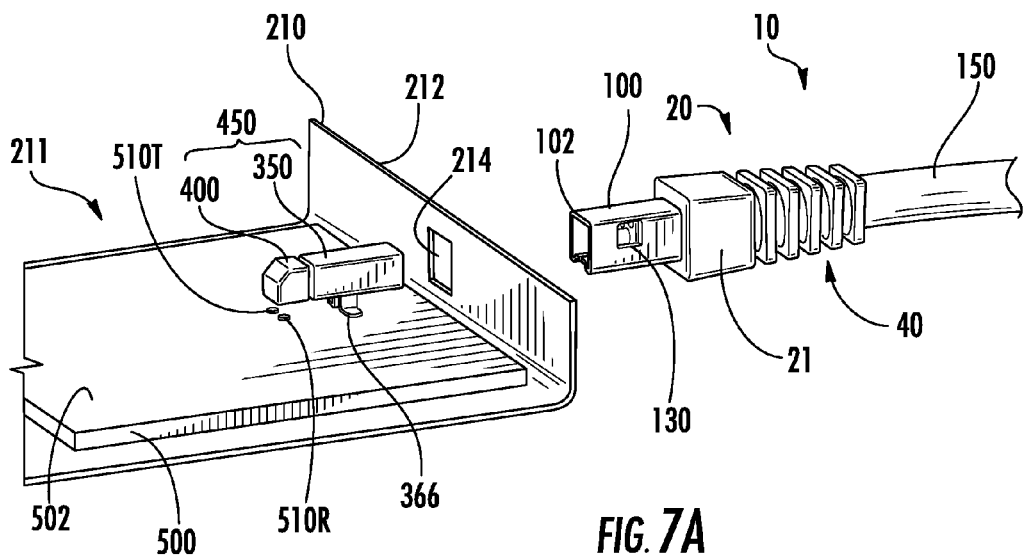
FIG. 7A is a rear elevated view similar to FIG. 6A, but with the receptacle housing removed to more clearly show the light-transmission member and the optical turn member.

Receptacle 320 further includes a light-transmitting member 350, as best seen in FIG. 7A. Light-transmitting member 350 has a body 351 with a central axis ARF, a front end 352, a rear end 354 and bottom surface 358 that is part of an outer surface 359. Light-transmitting member 350 includes a front section 356 adjacent front end 352 and a rear section 357 adjacent rear end 354. Front end 352 defines a front surface 353 that includes at least one curved surface portion 360, while rear end 354 defines a rear end surface 355. In the example shown, two curved portions 360 are shown on front surface 352, namely 360T and 360R that respectively correspond to transmit and receive receptacle lens surfaces for transmit and receive receptacle lenses 380T and 380R, as described below.

In an example, light-transmitting member 350 is made of a material that is substantially transparent to wavelengths in the range from 850 nm to 1550 nm, and further in an example is made of the same material as plug ferrule 50. Example materials for light-transmitting member 350 include the aforementioned transparent resin Polyetheremide ((PEI) or ULTEM® 1010.

Light-transmitting member 350 includes a central hole 388 formed in front end 352 of the light-transmitting member. Central hole 388 includes a receptacle electrical contact 390, e.g., in the form of a conducting sleeve that lines at least a portion of the central hole, i.e., electrical contact 390 comprises a socket.

Light-transmitting member 350 is supported by receptacle housing 321 in receptacle housing interior 328. Light-transmitting member 350 extends out of receptacle housing rear end 324 and is supported by side arms 340. The front end 352 of light-transmitting member 350 resides at housing front end 322, or is slightly set back therefrom.

In an example, receptacle 320 further includes an optical turn member 400 arranged adjacent rear end 354 of light-transmitting member 350. Optical turn member 400 is light-transmitting and includes a front end 402 with a front surface 403, an input/output end 404 with a corresponding surface 405, and an optical turning surface 410. Optical turning surface 410 is shown by way of example as an angled planar surface, but in other embodiments can be a curved surface, as discussed below. Front end 402 of optical turn member 400 is arranged adjacent rear end 354 of light-transmitting member 350. Further, input/output end 404 is arranged adjacent circuit board surface 502 and optical transmitter 510T and optical receiver 510R supported thereon.

In an example of optical turn member 400, front surface 403 and input/output surface 405 are perpendicular planar surfaces, and optical turning surface 410 is arranged at 45 degrees relative to surfaces 403 and 405.

Light-transmitting member 350 and optical turn member 400 comprise a light-transmitting system 450 having an optical path OP that has at least one change in the direction, for example an optical bend or turn. The at least one change in direction can be sharp or gradual, depending on the particular configuration of optical turn member 400. As discussed below, light-transmitting member 350 and optical turn member 400 can be formed as a unitary structure rather than as separate members.

Receptacle 320 has an associated optical alignment between receptacle housing 321, light-transmitting member 350, optical turn member 400, and optical transmitter 510T and optical receiver 510R. This optical alignment ensures for adequate (and for the best alignment, optimum) optical communication of transmit light 600T and receive light 600R over optical path OP and between plug 20 and receptacle 320 when the plug and receptacle are mated.

In an example, light-transmitting member 350 is supported by a first support member 366 attached to circuit board surface 502 and upon which the light-transmitting member bottom surface 358 rests, thereby elevating the light-transmitting member above the circuit board surface 502. Also in an example, optical turn member 400 is supported by a second support member 368 that also serves to elevate the optical turn member above circuit board surface 502. This allows for needed separation between input/output end 404 of optical turn member 400 and the optical transmitter 510T and optical receiver 510R supported on circuit board surface 502. An alternative is to make input/output surface 405 recessed so that input/output end 404 is supported on circuit board surface 502, while the recessed portion of the input/output surface is spaced apart from optical transmitter 510T and optical receiver 510R.

In an example, light-transmitting member 350 is supported by first support member 366 in a manner that allows the light transmitting member to be readily removed from the light-transmitting system 450 and replaced with another light-transmitting member without substantially affecting the receptacle optical alignment. This allows for receptacle 320 to be serviced by a straightforward replacement of light-transmitting member 350.

With reference again to FIG. 6C, light-transmitting member 350 is supported within receptacle housing interior 328 so that there is a gap 370 between the light-transmitting member outer surface 359 and housing interior walls 329. Gap 370 is sized to accommodate sheath 100 so that the sheath surrounds front section 326 of light-transmitting member 350 when plug 20 is mated with receptacle 320.

In an example sheath 100 has a transverse dimension $d_P$ in the range from 2 mm to 4 mm. The "horizontal" transverse dimension $d_P$ is shown by way of example, and this transverse dimension $d_P$ can also be in the "vertical" transverse direction.

Also, with reference again to FIG. 6A, in an example, optical transmitter 510T and optical receiver 510R are located in-board from electronic device housing side 112 by a distance $d_A$ from about 0.5 mm to about 12 mm.

Figure 7B:
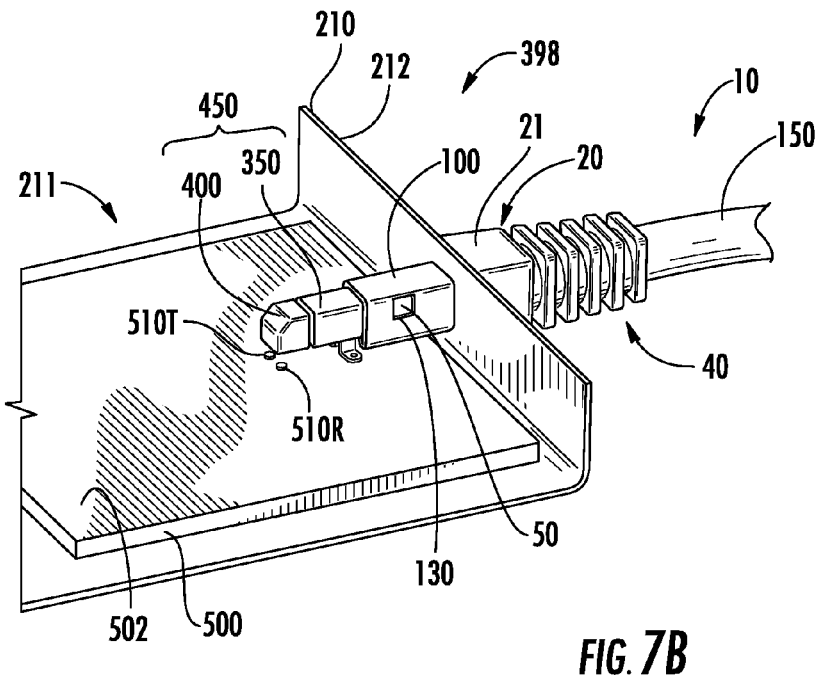
FIG. 7B is similar to FIG. 7A and shows the plug engaged with the receptacle, with the plug sheath surrounding the front section of the light-transmitting member.
Figure 8A:
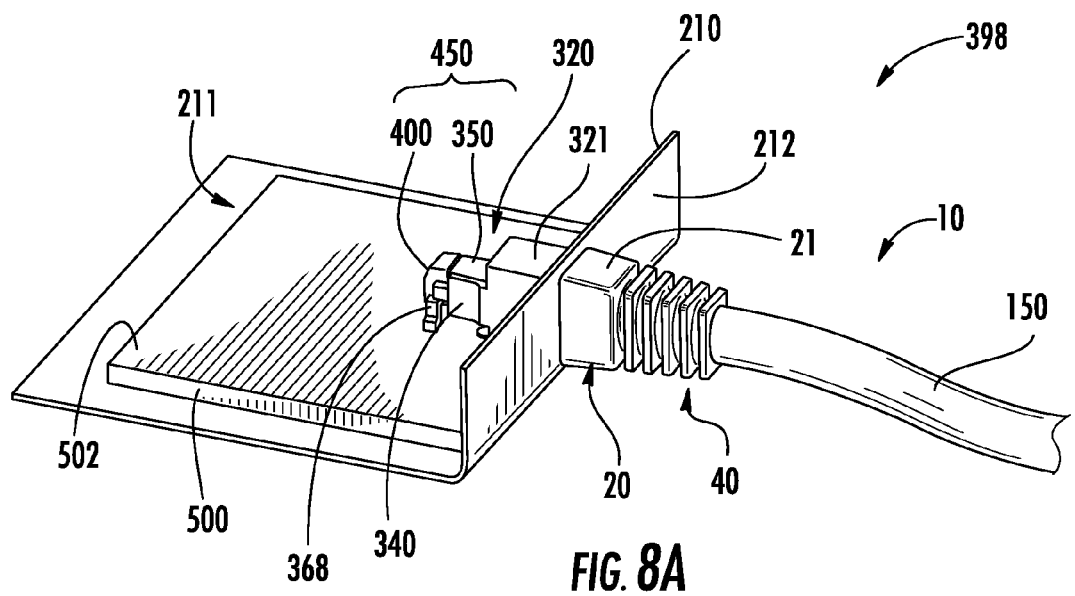
FIG. 8A and FIG. 8B are front elevated and rear elevated views similar to FIG. 7B and showing the receptacle with the receptacle housing in place.
Figure 8B:
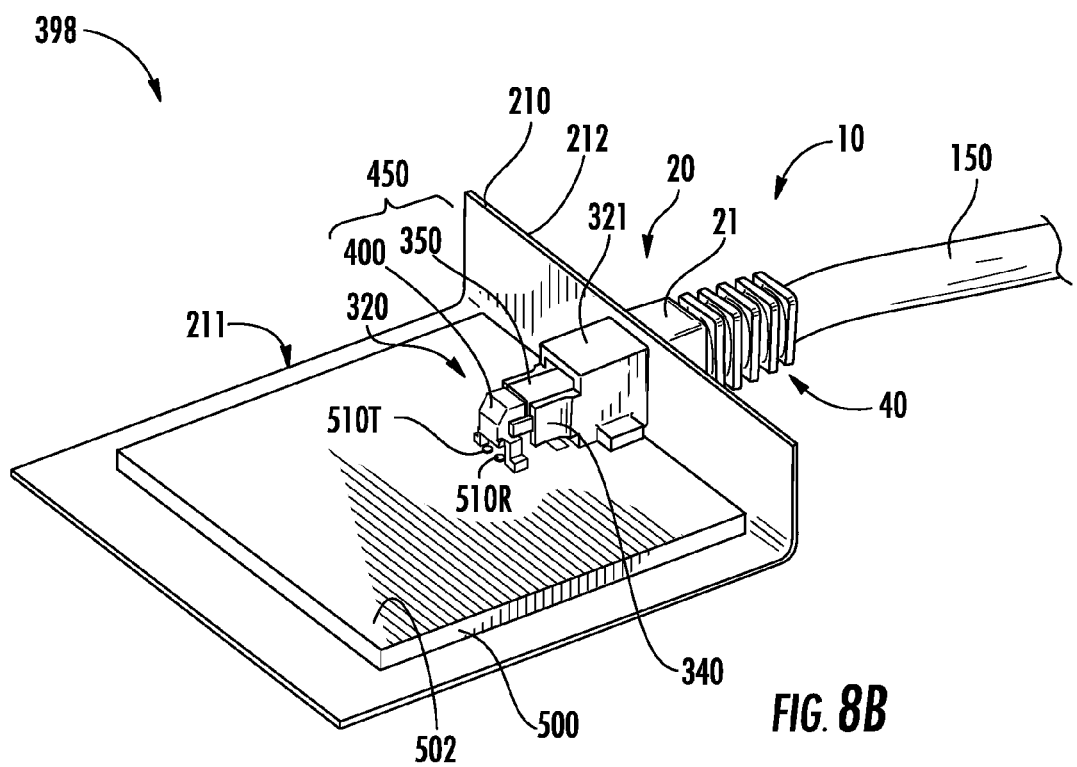

FIG. 7B is a rear-elevated, close-up cut-away view of plug 20 engaged with receptacle 320 but with receptacle housing 321 not shown to illustrate how sheath 100 surrounds the front end 326 of light-transmitting member 350. FIG. 8A and FIG. 8B are front-elevated and rear-elevated views similar to FIG. 7B but showing receptacle 320 with receptacle housing 321 in place, thereby forming a fiber optic interface assembly 398.

Figure 9A:
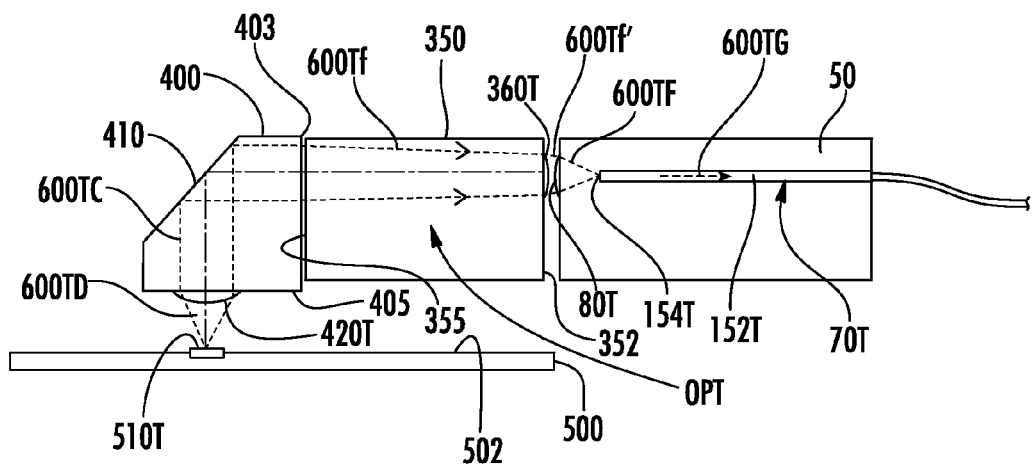
FIG. 9A is a schematic cross-sectional view of the plug ferrule and the light-transmitting and optical turn members of the receptacle, illustrating the optical path of transmit light from the optical transmitter in the electronic device to the transmit optical fiber in the plug.

FIG. 9A is a schematic cross-sectional view of plug ferrule 20 and the light-transmitting and optical turn members 400 of receptacle 320, illustrating the optical path OPT of transmit light 600T from optical transmitter 510T to transmit optical fiber 152T. With reference to FIG. 9A, optical transmitter 510T emits divergent transmit light 600TD that is incident upon input/output surface 405 of optical turn member 400. In an example, input/output surface 405 includes a transmit lens 420T that serves to reduce the amount of divergence in divergent transmit light 600TD, i.e., forms weakly convergent (focused) transmit light 600Tf. This weakly convergent transmit light 600Tf is turned by optical turning surface 410 (e.g., via internal reflection) and travels to front surface 403 of optical turn member 400. Weakly convergent transmit light 600Tf passes through front surface 403 of optical turn member 400 and passes through rear end surface 355 of light-transmitting member 350. Weakly convergent transmit light 600Tf continues on to receptacle transmit lens 360T, which forms from this weakly convergent transmit light more focused transmit light 600Tf. This more focused transmit light is received by plug transmit lens 80T, which forms a strongly focused transmit light 600TF that converges onto end 154T of transmit optical fiber 152T. This results in the formation of guided transmit light 600TG that travels down transmit optical fiber 152T and down fiber optic cable 150 to a remote component (not shown). Note that the transmit optical path OPT includes at least one bend defined by optical turning surface 410.

Figure 9B:
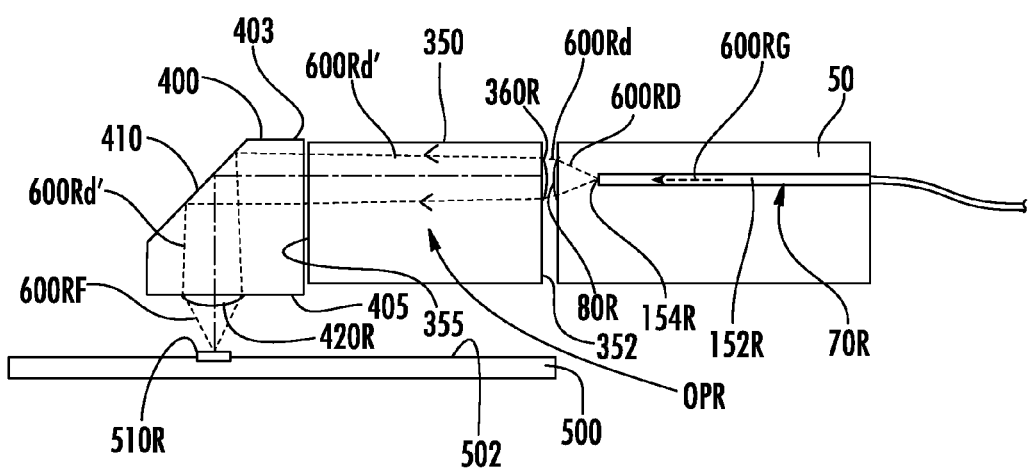
FIG. 9B is similar to FIG. 9A and illustrates the optical path of receive light from the receive optical fiber in FIG. 10A through FIG. 10C are different views of an example plug where the transmit and receive optical fibers terminate at the front surface of the plug ferrule.

FIG. 9B is similar to FIG. 9A and illustrates the optical path OPR of receive light 600R from receive optical fiber 152R to optical receiver 510R. With reference to FIG. 9B, guided receive light 600RG traveling in receive optical fiber 152R exits receive optical fiber end 154R as strongly divergent receive light 600RD. This strongly divergent light 600RD is received by plug receive lens 80R, which forms less divergent receive light 600Rd. This less divergent receive light 600Rd is then received by receptacle receive lens 360R, which forms even less divergent (i.e., weakly divergent) receive light 600Rd' that travels through light-transmitting member body 351 and exits rear end surface 355. This weakly divergent receive light 600Rd' then enters optical turn member 400 at front surface 403 and is turned by optical turning surface 410 (e.g., by internal reflection) to travel to input/output surface 405. The weakly divergent receive light 600Rd' then encounters receive lens 420R at input/output surface 405. Receive lens 420R serves to strongly focus weakly divergent receive light 600Rd' to form strongly focused receive light 600RF that is incident upon optical receiver 510R. Optical receiver 510 then converts the detected receive light 600RF and the optical signals therein into electrical signals (not shown) that are processed by components (not shown) on circuit board 500. Note that the receive optical path OPR includes at least one bend defined by optical turning surface 410.

The transmit and receive optical paths OPT and OPR respectively described above in connection with FIG. 9A and FIG. 9B respectively are examples based on an example configuration of lenses. The lens configuration can be varied (including certain lenses being eliminated) to form different optical path configurations, including those described below.

In an alternate example embodiment, light-transmitting member 350 incorporates optical turn member 400, e.g., by having light-transmitting member rear section 357 configured with an optical turning surface 410. An advantage of having optical turn member 400 be a separate component from light-transmitting member 350 is that these two components can be separately removed, which can facilitate repair and servicing, as discussed above.

Figure 10A:
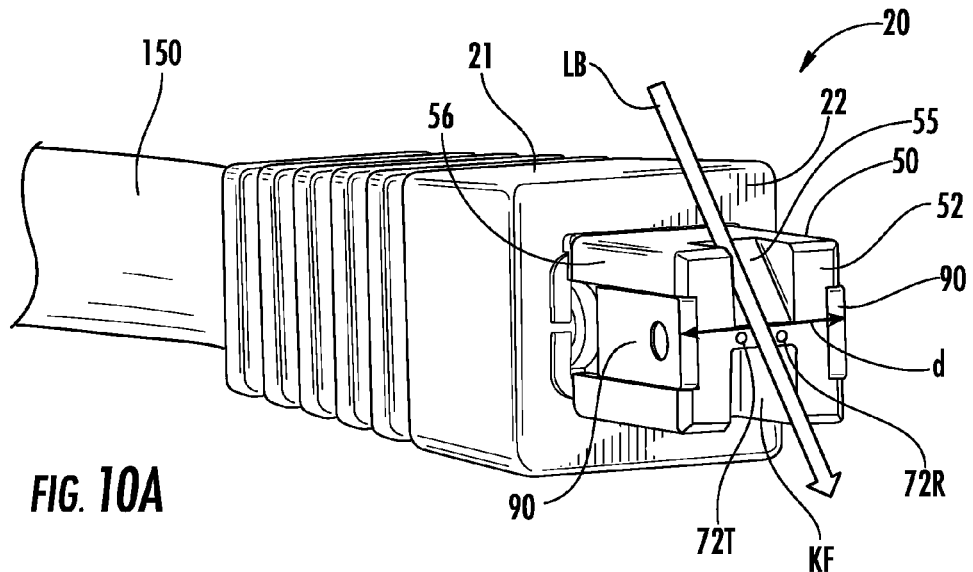
Figure 10B:
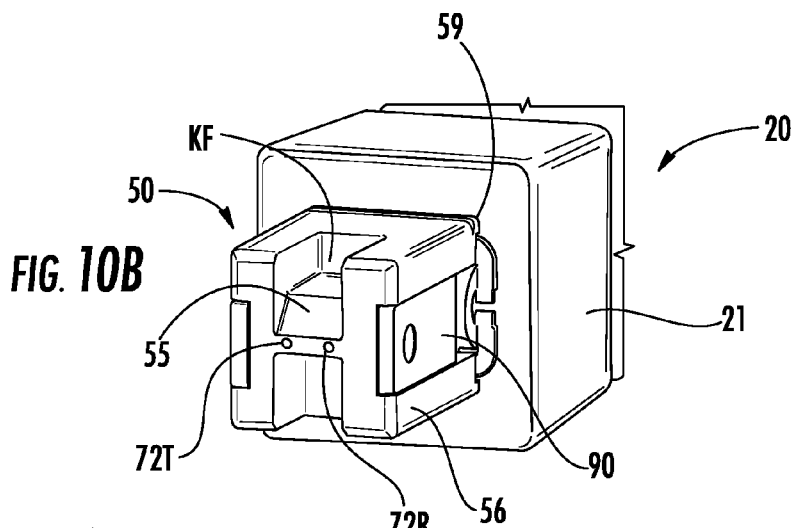
Figure 10C:
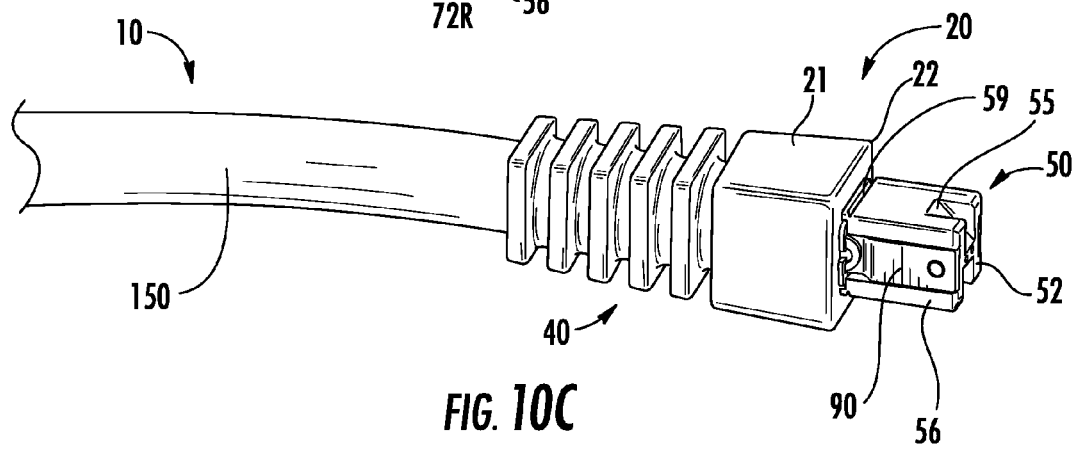

FIG. 10A through FIG. 10C are different views of an example plug 20 wherein plug ferrule 50 has transmit and receive bores 70 having bore ends 72 at ferrule front end 52. Further, ferrule body 51 includes at least one angled facet 55 adjacent plug ferrule front end 52 and aligned with bore ends 72. The at least one angled facet 55 is configured so that a laser beam LB can be used to laser process optical fibers 152 that extend from bores 72. Plug ferrule 55 also has sides 56 that support respective electrical contacts 90. Plug ferrule 50 also includes a keying feature KF for ensuring the proper orientation (polarization) when mating with a corresponding receptacle having a complementary keying feature.

Plug ferrule 50 also optionally includes a break-away feature 59 that allows the plug ferrule to break away when subjected to a substantial transverse mechanical force. An example break-away feature 59 is a groove formed in plug ferrule body 50 adjacent housing front end 22.

With reference to FIG. 10A, in an example, plug ferrule 50 has a transverse dimension d in the range from 2 mm to 4 mm. The "horizontal" transverse dimension d is shown by way of example, and this transverse dimension can also be in the "vertical" transverse direction.

Figure 11A:
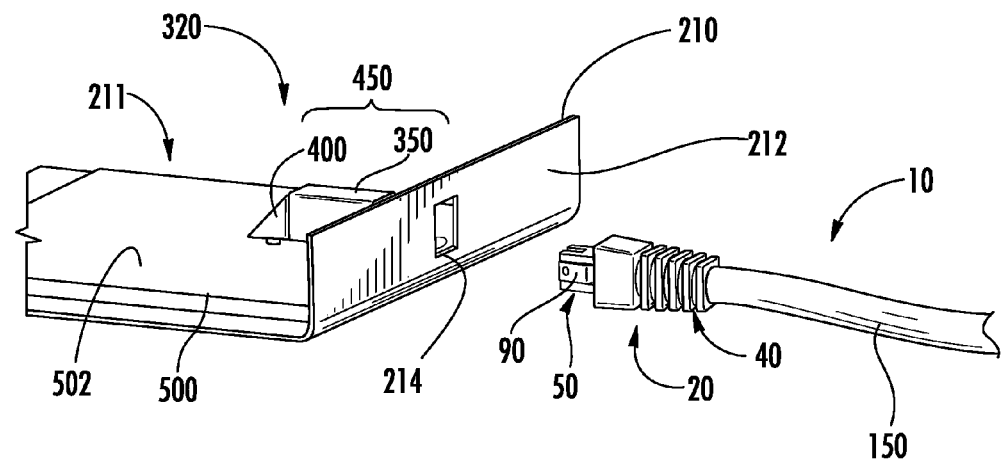
FIG. 11A is a front-end elevated view and FIG. 11B is a rear-end elevated view of an example receptacle in the device housing, along with the example plug of FIG. 10A through FIG. 10C.
Figure 11B:
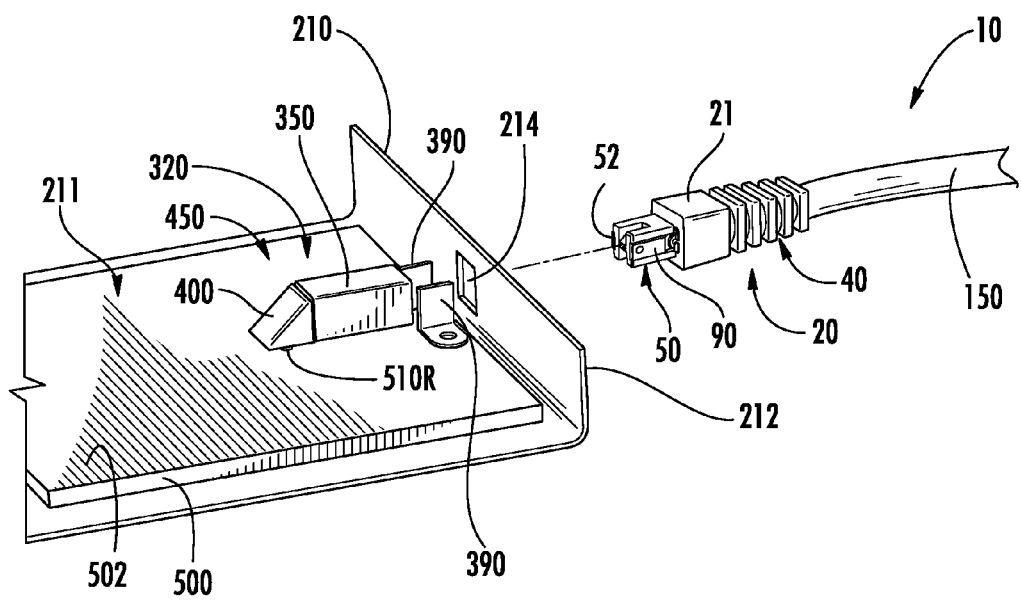
Figure 12A:
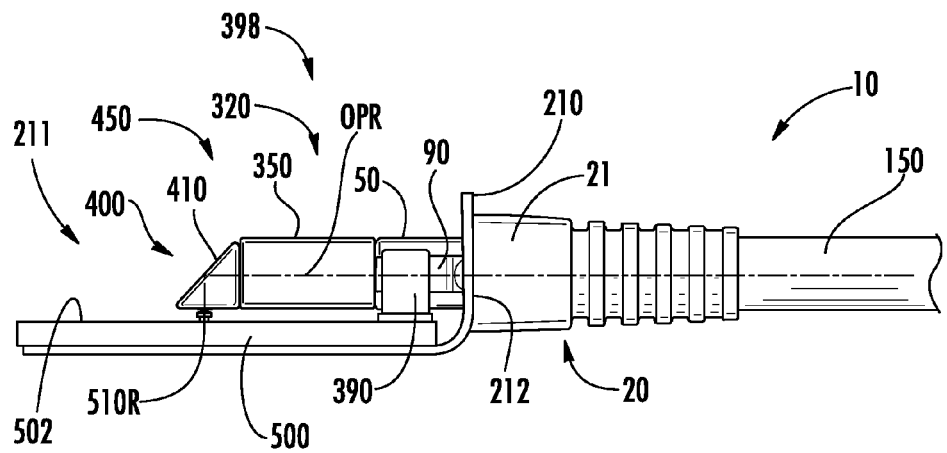
FIG. 12A is a side cut-away view of an example fiber optic interface assembly with the plug of FIG. 10A through FIG. 10C.
Figure 12B:
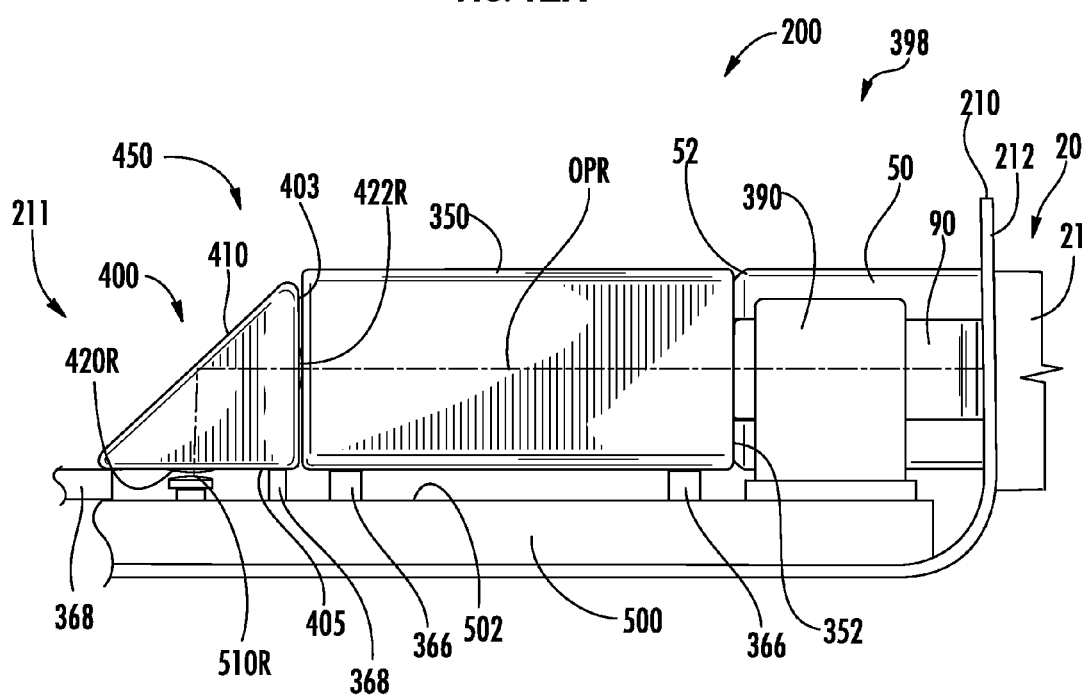
FIG. 12B is a close-up side cut-away view of a portion of the fiber optic interface assembly of FIG. 12A.

FIG. 11A is a front-end elevated view and FIG. 11B is a rear-end elevated view of an example receptacle 320 in device housing 210, along with the example plug 20 of FIGS. 10A through 10C. FIG. 12A is a side cut-away view of an example fiber optic interface assembly 398 with plug 20 of FIGS. 11A through 10C, and FIG. 12B is a close-up side cut-away view of a portion of the fiber optic interface assembly 398 of FIG. 12A.

Receptacle 320 is similar to the example receptacle described above (see, e.g., FIGS. 6A and 7A) except that electrical contacts 390 are not internal to light transmitting element 350, but rather extend upward from circuit board upper surface 502 such that they contact plug electrical contacts 90 when plug 20 engages receptacle 320. Also, optical turn member 400 includes transmit and receive lenses 422T and 422R on front surface 403 in addition to transmit and receive lenses 420T and 420R on input/output surface 405.

Figure 13A:
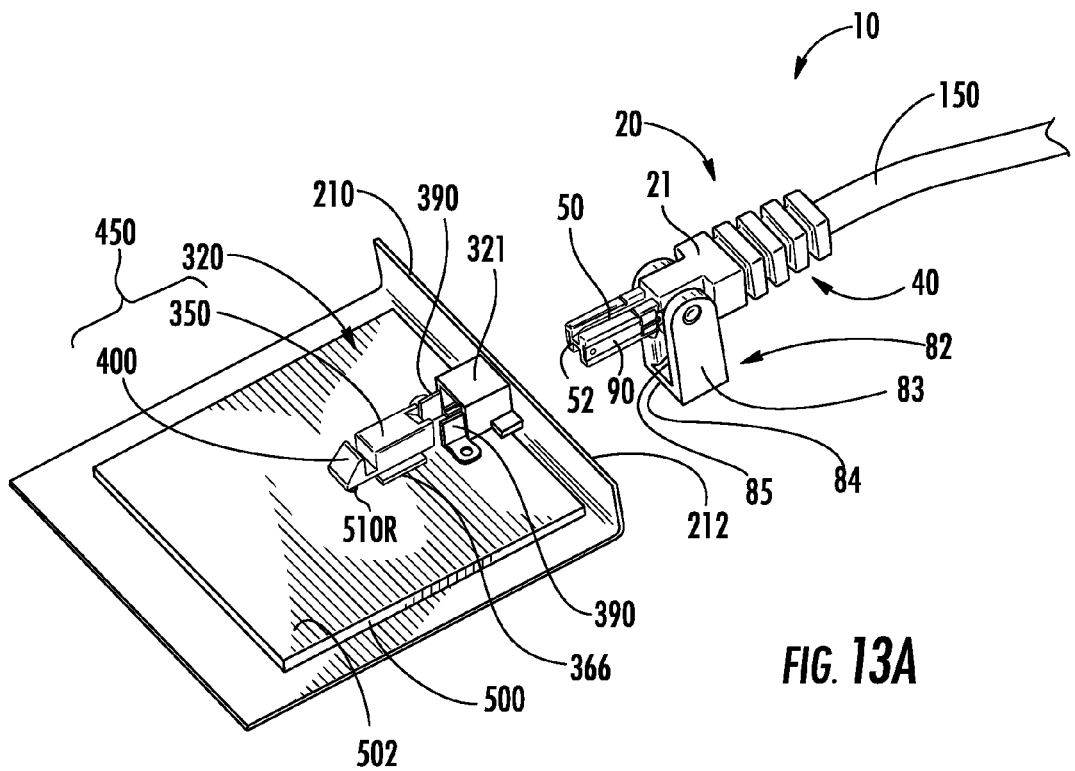
FIG. 13A and FIG. 13B are rear elevated views similar to FIG. 11B that show the receptacle with the receptacle housing, and the plug with an adjustable dust cover.
Figure 13B:
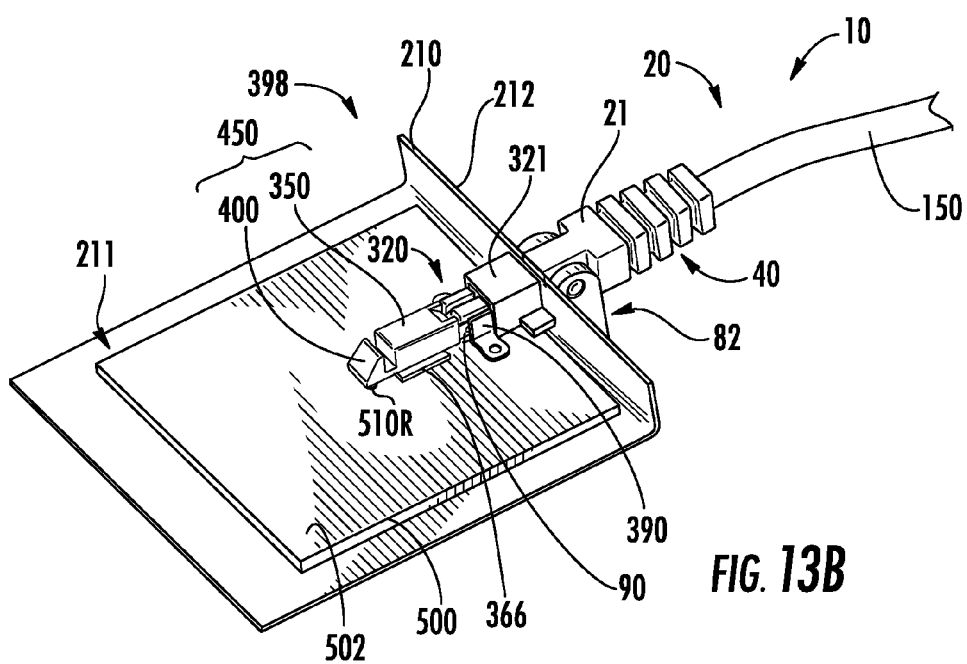

FIG. 13A and FIG. 13B are rear elevated views similar to FIG. 11B that show receptacle 320 with receptacle housing 321, and plug 20 with an adjustable dust cover 82 having a U-shape with arms 83 and an end 84. Arms 83 are secured to plug housing 21 in a hinge-like fashion so that dust cover end 84 can swing up and cover plug ferrule end 52 when plug 20 is unmated and swing away from the plug ferrule end when plug 20 is mated. In an example, adjustable dust cover end 84 includes a cleaning material 85 that serves to clean plug ferrule end 52 as the dust cover moves in and out of the covering position.

Figure 14A:
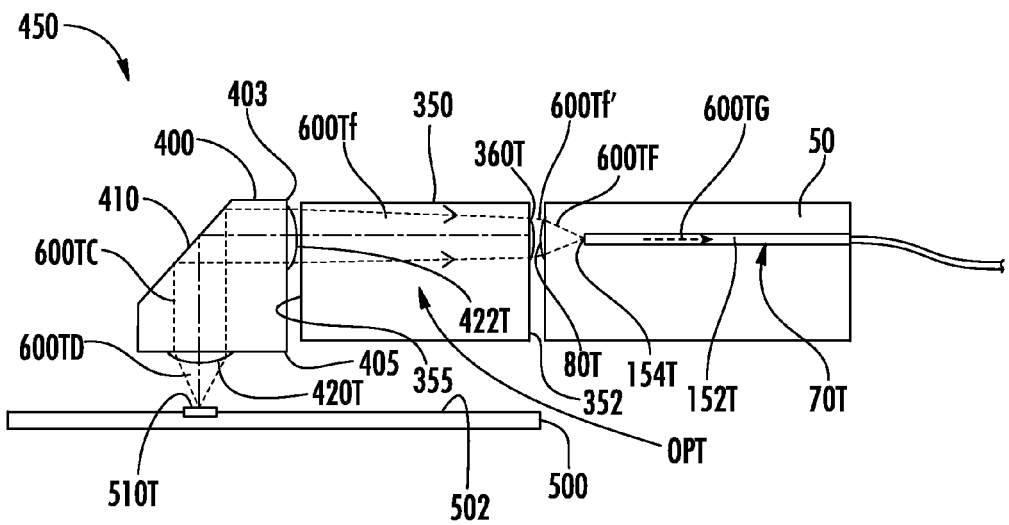
FIG. 14A and FIG. 14B are similar to FIG. 9A and FIG. 9B and respectively illustrate the transmit light and receive light optical paths for the fiber optic interface assembly of FIG. 12A.
Figure 14B:
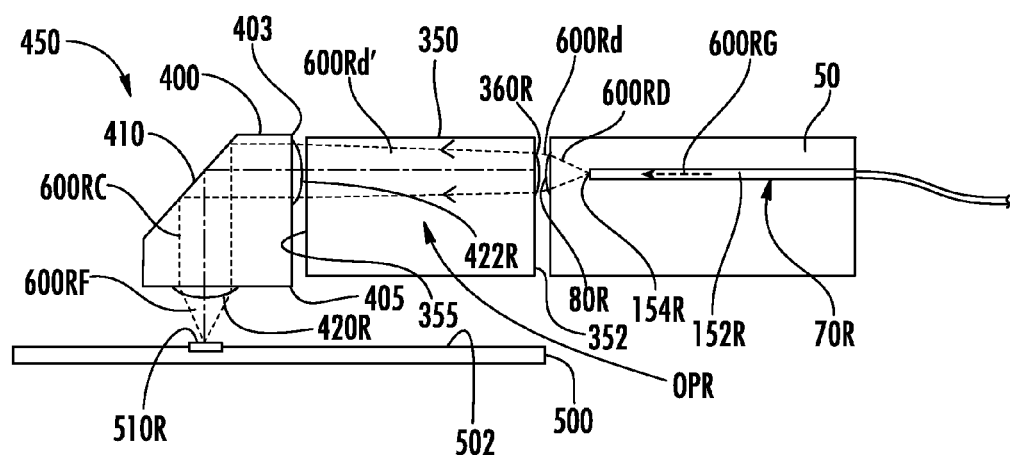

FIG. 14A and FIG. 14B are similar to FIG. 9A and FIG. 9B and respectively illustrate the transmit light and receive light optical paths OPT and OPR for the fiber optic interface assembly 398 of FIG. 12A. With reference to FIG. 14A, optical transmitter 510T emits divergent transmit light 600TD that is incident upon input/output surface 405 of optical turn member 400. In an example, input/output surface 405 includes a transmit lens 420T that serves to form substantially collimated transmit light 600TC. This substantially collimated transmit light 600TC is turned by optical turning surface 410 (e.g., via internal reflection) and travels to front surface 403 of optical turn member 400 and to transmit lens 422T. Transmit lens 422T converts substantially collimated transmit light 610C to weakly focused transmit light 600Tf, which passes through rear end surface 355 of light-transmitting member 350 and continues on to receptacle transmit lens 360T. Receptacle transmit lens 360T forms this weakly focused transmit light into more focused transmit light 600Tf. This more focused transmit light is received by plug transmit lens 80T, which forms a strongly focused transmit light 600TF that converges onto end 154T of transmit optical fiber 152T. This results in the formation of guided transmit light 600TG that travels down transmit optical fiber 152T and down fiber optic cable 150 to a remote component (not shown). Note that the transmit optical path OPT includes at least one bend (i.e., change in direction) defined by optical turning surface 410.

FIG. 14B is similar to FIG. 14A and illustrates the optical path of receive light 600R from receive optical fiber 152R to optical receiver 510R. With reference to FIG. 14B, guided receive light 600RG traveling in receive optical fiber 152R exits receive optical fiber end 154R as strongly divergent receive light 600RD. This strongly divergent light is received by plug receive lens 80R, which forms less divergent receive light 600Rd. This less divergent receive light 600Rd is then received by receptacle receive lens 360R, which forms even less divergent (i.e., weakly divergent) receive light 600Rd' that travels through light-transmitting member body 351 and exits rear end surface 355. This weakly divergent receive light then enters optical turn member at front surface 403 by passing through receive lens 422R, which forms substantially collimated receive light 600RC. The substantially collimated receive light 600RC travels to optical turning surface 410 and is turned (e.g., by internal reflection) to travel to input/output surface 405. Substantially collimated receive light 600RC then encounters receive lens 420R at input/output surface 405. Receive lens 420R serves to strongly focus substantially collimated receive light 600RC to form focused receive light 600RF that is incident upon optical receiver 510R. Optical receiver 510 then converts the detected receive light 600RF and the optical signals therein into electrical signals (not shown) that are processed by components (not shown) on circuit board 500. Note that the receive optical path OPR includes at least one bend (i.e., change in direction) defined by optical turning surface 410.

The receptacles 320 described above serve to deliver optical signals from an inboard optical transmitter 510T to the periphery (e.g., device housing side 212) of electronic device 200. Likewise, the receptacles 320 serve to deliver optical signals from an external fiber optic cable assembly 10 attached to the electronic device periphery 212 to an inboard optical receiver 510R. The use of both a light-transmitting element 350 and an optical turn element 400 facilitates replacing components of the receptacle 320. The judicious placement of at least one plug electrical contact 90 and corresponding at least one receptacle electrical contact 390 allows fiber optic interface assembly 398 to have both optical and electrical communication.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A fiber optic interface device comprising:
   a housing having a front end, a rear end and an interior;
   a ferrule having a body with a front section having an outer surface and a front end with a front surface, and a rear section with a rear end, the ferrule rear section supported in the housing interior with the ferrule front section extending from the housing front end, the ferrule body having at least one bore formed therein that supports at least one optical waveguide that terminates within the ferrule, the ferrule having at least one lens defined on the ferrule front surface and that is operably aligned with the at least one bore;
   a first electrical contact supported by the ferrule body; and
   a second electrical contact that substantially surrounds the outer surface of the ferrule body front section, the ferrule body comprising a dielectric material at least partially interposed between the first and second electrical contacts.

2. The fiber optic interface device of claim 1, further comprising the first electrode comprising one of a pin, a blade, a cylinder, a spring contact, a wire, a male or female shaped contact, or a conductive electrical trace on the ferrule.

3. The fiber optic interface device of claim 1, further comprising the second electric contact comprising a generally cylindrical sheath.

4. The fiber optic interface device of claim 1, wherein the second electrical contact includes at least one aperture configured to provide access to the front surface of the ferrule front end with a cleaning element.

5. The fiber optic interface device according to claim 1, further comprising at least one of:
   a) a keying feature configured to operably engage a complementary keying feature of another fiber optic interface device; and
   b) an alignment feature configured to provide a select orientation relative to said another fiber optic interface device.

6. The fiber optic interface device according to claim 1, further comprising:
   a fiber optic cable operably attached to the housing rear end and containing the at least one optical fiber and first and second electrical wires, with the at least one optical fiber supported in the at least one bore and the first and second electrical wires respectively electrically connected to the first and second electrical contacts.

7. The fiber optic interface device according to claim 6, further comprising:
   the at least one optical fiber comprising transmit and receive optical fibers, and the at least one lens comprising corresponding transmit and receive lenses.

8. The fiber optic interface device of claim 1, further comprising the ferrule body front end having a transverse dimension of between about 2 mm and about 4 mm.

9. A fiber optic interface assembly, comprising:
   the fiber optic interface device of claim 1 as a first fiber optic interface device; and
   a second fiber optic interface matingly engaged with the first fiber optic interface device.

10. The fiber optic interface assembly of claim 9, further comprising:
    the second fiber optic interface device supported in an electronic device and configured as a receptacle; and
    the first fiber optic interface device configured as a plug.

11. The fiber optic interface assembly of claim 9, wherein the receptacle defines respective transmit and receive optical paths to an optical transmitter and optical receiver operably supported within the electronic device and located in-board from an electronic device housing side by a distance from about 0.5 mm to about 12 mm.

12. A fiber optic interface device for an electronic device having an optical transmitter and an optical receiver, comprising:
    a housing having front and rear open ends and an interior; and
    a light-transmitting system residing at least in part within the housing interior, the light-transmitting system having a light-transmitting member with a front end that defines a front surface of the light-transmitting system, an optical turning member with a first end arranged adjacent the light-transmitting member and a second end configured to be arranged adjacent the optical transmitter and receiver, at least one transmit and at least one receive lens defined by at least one of the light-transmitting member and the optical turning member, the light-transmitting system defining respective transmit and receive optical paths from the optical transmitter and optical receiver to the front surface of the light-transmitting system, with the optical turning member of the light-transmitting system having an optical turning surface configured to make at least one change in direction in each of the transmit and receive optical paths.

13. A fiber optic interface device for an electronic device having an optical transmitter and an optical receiver, comprising:

a housing having front and rear open ends and an interior; and a light-transmitting system having a front surface and residing at least in part within the housing interior, the light-transmitting system having at least one transmit lens and at least one receive lens, the light-transmitting system defining respective transmit and receive optical paths from the optical transmitter and optical receiver to the front surface of the light-transmitting system, with the light-transmitting system defining at least one change in direction in each of the transmit and receive optical paths;

wherein the light-transmitting system comprises:
a light-transmitting member with a front end that defines the light-transmitting system front surface, and having a rear end with a rear surface substantially parallel to the front surface; and an optical turning member configured to make the at least one change in direction in each of the transmit and receive optical paths, said optical turning member having first and second ends with respective first and second surfaces that are not parallel, the optical turning member having an optical turning surface, the first end of the optical turning member being arranged adjacent the rear surface of the light-transmitting member, and the second end being arranged adjacent the optical transmitter and optical receiver; and the at least one transmit lens and the at least one receive lens defined by at least one of the light-transmitting member and the optical turning member.

14. The fiber optic interface device of claim 12, further comprising the optical turning member and the light transmitting member each including at least one transmit lens and at least one receive lens.

15. The fiber optic interface device of claim 12, further comprising the optical turning surface being selected from one of a planar surface and a curved surface.

16. The fiber optic interface device of claim 12, further comprising the light-transmitting member and the optical turning member being formed as a unitary structure.

17. The fiber optic interface device of claim 12, further comprising the light-transmitting system having an optical alignment, and comprising the light-transmitting member being configured to be removed from the light-transmitting system and replaced with another light-transmitting member without substantially affecting the optical alignment of the light-transmitting system.

18. The fiber optic interface device of claim 12, wherein the housing front open end defines an aperture having a transverse dimension of between about 2 mm and about 4 mm.

19. The fiber optic interface device of claim 12, further comprising a first electrical contact at least partially supported within a portion of the light-transmitting system and a second electrical contact supported adjacent the light-transmitting system.

20. The fiber optic interface device of claim 19, further comprising the first electrical contact comprising a socket.

21. The fiber optic interface device of claim 12, further comprising at least one of:
a) a keying feature configured to operably engage a complementary keying feature of another fiber optic interface device; and
b) an alignment feature configured to provide a select orientation relative to said another fiber optic interface device.

22. A fiber optic interface assembly, comprising:
the fiber optic interface device of claim 12 as a first fiber optic interface device; and
a second fiber optic interface matingly engaged with the first fiber optic interface device.

23. The fiber optic interface assembly of claim 22, further comprising:
the first optic interface device supported in an electronic device and configured as a receptacle; and
the second fiber optic interface device configured as a plug.

24. A fiber optic interface device comprising:
a housing having a front end, a rear end and an interior;
a ferrule having a body with opposite sides, a front section having a front end with a front surface, and a rear section with a rear end, the ferrule rear section supported in the housing interior with the ferrule front section extending from the housing front end, the ferrule body having at least one bore formed therein configured to support at least one optical waveguide that terminates at the ferrule body front surface, the ferrule body having at least one angled facet adjacent the front end and aligned with the at least one bore;
a break-away feature formed in the ferrule body that allows a portion of the ferrule body to break away when subjected to a sufficient transverse mechanical force;
first and second electrical contacts disposed on the ferrule body sides; and
the ferrule body front end having a transverse dimension of between about 2 mm and about 4 mm.

25. The fiber optic interface device of claim 24, further comprising the at least one optical fiber.

26. The fiber optic interface device of claim 25, further comprising the at least one optical fiber comprising a transmit optical fiber and a receive optical fiber.

27. The fiber optic interface device according to claim 25, further comprising the ferrule body having at least one of:
a) a keying feature configured to operably engage a complementary keying feature of another fiber optic interface device; and
b) an alignment feature configured to provide a select orientation relative to said another fiber optic interface device.

28. A fiber optic interface assembly, comprising:
the fiber optic interface device of claim 24 as a first fiber optic interface device; and
a second fiber optic interface matingly engaged with the first fiber optic interface device.

29. The fiber optic interface assembly of claim 28, further comprising:
the second fiber optic interface device supported in an electronic device and configured as a receptacle; and
the first fiber optic interface device configured as a plug.

30. The fiber optic interface device of claim 24, wherein the break-away feature comprises a groove formed in the ferrule body adjacent the ferrule body front end.

31. A fiber optic interface device comprising:
a housing having a front end, a rear end and an interior;
a ferrule having a body with opposite sides, a front section having a front end with a front surface, and a rear section with a rear end, the ferrule rear section supported in the housing interior with the ferrule front section extending from the housing front end, the ferrule body having at least one bore formed therein configured to support at least one optical waveguide that terminates at the ferrule body front surface; and a break-away feature formed in the ferrule body that allows a portion of the ferrule body to break away when subjected to a sufficient transverse mechanical force.

32. The fiber optic interface device of claim 31, wherein the break-away feature comprises a groove formed in the ferrule body adjacent the ferrule body front end.

* * * * *